US012462900B2

United States Patent
Konstantinov et al.

(10) Patent No.: US 12,462,900 B2
(45) Date of Patent: Nov. 4, 2025

(54) RETROSYNTHESIS SYSTEMS AND METHODS

(71) Applicant: Insilico Medicine IP Limited

(72) Inventors: Anton Konstantinov, Saint Petersburg (RU); Evgeny Olegovich Putin, St. Petersburg (RU); Bogdan Zagribelnyy, Pak Shek Kok (HK); Yan A. Ivanenkov, Moscow (RU); Aleksandrs Zavoronkovs, Pak Shek Kok (HK)

(73) Assignee: INSILICO MEDICINE IP LIMITED, Hong Kong (HK)

( * ) Notice: Subject to any disclaimer, the term of this patent is extended or adjusted under 35 U.S.C. 154(b) by 1004 days.

(21) Appl. No.: 17/456,860

(22) Filed: Nov. 29, 2021

(65) Prior Publication Data

US 2022/0172802 A1 Jun. 2, 2022

Related U.S. Application Data

(60) Provisional application No. 63/119,514, filed on Nov. 30, 2020.

(51) Int. Cl.
*G16C 20/10* (2019.01)
*G16C 20/70* (2019.01)

(52) U.S. Cl.
CPC ............. *G16C 20/10* (2019.02); *G16C 20/70* (2019.02)

(58) Field of Classification Search
CPC .................................. G16C 20/70; G16C 20/10
See application file for complete search history.

(56) References Cited

U.S. PATENT DOCUMENTS

| | | | | |
|---|---|---|---|---|
| 6,597,958 B1* | 7/2003 | Starr | ................. | G05B 23/0243 703/2 |
| 9,529,348 B2* | 12/2016 | Kephart | ........... | G05B 19/41885 |
| 10,545,482 B2* | 1/2020 | Dash | ..................... | G05B 17/02 |
| 11,853,032 B2* | 12/2023 | Chan | .................. | G05B 19/4155 |
| 11,857,939 B2* | 1/2024 | Lusk | .................... | G05B 13/048 |
| 2004/0260421 A1* | 12/2004 | Persson | ................ | D21G 9/0018 162/263 |

(Continued)

OTHER PUBLICATIONS

European Patent Office; International Search Report and Written Opinion dated Mar. 2, 2022 issued in PCT App. No. PCT/IB2021/01093; 14 pages.

(Continued)

*Primary Examiner* — Shogo Sasaki
(74) *Attorney, Agent, or Firm* — MASCHOFF BRENNAN

(57) ABSTRACT

A synthesis protocol for a reaction pathway of a target molecule can be determined by: providing target compound data; performing a chemical synthesis search for at least one reaction pathway for the target compound; processing the target compound data through a single-step reaction enumeration algorithm to obtain at least one reaction step of the least one reaction pathway; processing at least one reaction step with the at least one reaction pathway scoring mechanism model to obtain a reaction step score; constructing reaction pathways based on at least one reaction step and at least one reaction step score; providing a selectivity filter having a selectivity criteria; filtering the reaction pathways so that reactions violating the selectivity criteria is filtered out; ranking the reaction pathways; and providing the reaction pathway ranking.

23 Claims, 12 Drawing Sheets

(56) References Cited

U.S. PATENT DOCUMENTS

| | | | | |
|---|---|---|---|---|
| 2016/0026171 | A1* | 1/2016 | Dash | G05B 17/02 |
| | | | | 700/267 |
| 2018/0353925 | A1* | 12/2018 | Giiazov | B01J 19/0006 |
| 2020/0012265 | A1* | 1/2020 | Thomsen | G06F 3/0481 |
| 2020/0379442 | A1* | 12/2020 | Chan | B01J 19/0033 |
| 2022/0072500 | A1* | 3/2022 | Lusk | C02F 1/686 |
| 2022/0260980 | A1* | 8/2022 | Andreu | G06N 20/00 |
| 2022/0397886 | A1* | 12/2022 | Hong | G16C 20/10 |

OTHER PUBLICATIONS

Lin, Kangjie et al.; "Automatic Retrosynthetic Pathway Planning Using Template-Free Models"; Cornell University Library; May 21, 2019; XP081366866.

Coley, Connor W. et al.; "Machine Learning in Computer-Aided Synthesis Planning"; COl. 51, No. 5; May 1, 2018; p. 1281-1289; XP055660945; US ISSN: 0001-4842; DOI: 10.1021/acs/accounts. 8b00087.

Segler, Marwin H.S. et al.; "Learning to Plan Chemical Syntheses"; Cornell University Library; Aug. 14, 2017; XP080952822; DOI: 10.1038/NATURE25978.

Dai; Hanjun et al.; "Retrosynthesis Prediction With Conditional Graph Logic Network"; Cornell University Library; Jan. 6, 2020; XP081572593.

\* cited by examiner

RETROSYNTHESIS SYSTEMS AND METHODS

CROSS-REFERENCE TO RELATED APPLICATIONS

This patent application claims priority to U.S. Provisional Application No. 63/119,514 filed Nov. 30, 2020, which provisional is incorporated herein by specific reference in its entirety.

BACKGROUND

Field

The present disclosure relates to a retrosynthesis system and method. More particularly, the retrosynthesis system and method uses reaction data for designing a reaction pathway for a target molecule.

Description of Related Art

Previously, organic synthesis planning has been performed by chemists in order to design a large-scale, cost-effective, convenient and safe way to synthesize the desired chemical compound. The synthesis protocol may be determined for a compound based on the needs of pharmaceutics (e.g., drug delivery parameters) or material design. The task of synthesis planning can be a manual endeavor and may require substantial amounts of time to study the literature regarding the synthesis of similar compounds. Accordingly, the more complex or unique the structural features are in a target compound, the more complex the reaction pathway to obtain the complex target compounds. Moreover, designing a good synthesis pathway may require a high degree of creativity from the chemist.

Over the last few decades, computer-aided synthesis planning (CASP) systems have evolved from using hand-coded rules to utilizing the automatically gathered arrays of data. Modern CASP software systems rely on the collected historical knowledge of previously designed, reported and time-proven pathways to support the planning by extrapolating this prior knowledge to the task of a reaction being designed. The knowledge database of such systems is usually derived from the (e.g., curated or otherwise) databases of reactions and the expert-based rules devised by chemists.

In a synthesis planning protocol, the transformations can be applied recursively starting from the target compound until the substrates are simple enough to be considered starting materials. To be a starting material, the reagents are preferably common compounds that can be easily acquired. For example, the reagents can be obtained from a contracted vendor, which are also called building blocks. For many small organic molecules used in pharmaceutics, the pathway would contain from five to seven steps until commercial building blocks are reached, which usually already contain most of the non-trivial chemistry (e.g. functionalized heterocycles). On the other hand, natural product synthesis can have pathways that tend to be much longer and can exceed more than ten steps in the route planning. Apart from the knowledge database, CASP systems heavily rely on the algorithms for enumerating the possible transformations in the chemical space and the algorithms to identify possible pathways and select the best among them.

It is known that a Monte-Carlo Tree Search (MCTS) is a heuristic search algorithm for Markov decision processes, which are often used in board games playing software (e.g. software for go and chess games). It is used to find an optimal sequence of actions to obtain maximum reward at the terminal state. The optimization is carried out through random rollouts, which are used to estimate the expected reward for each action in each state. The number of visits for each state-action pair is also tracked to balance between exploration (e.g., trying out new unsearched nodes) and exploitation (e.g., picking the current best action according to rollout results).

Each iteration of a MCTS algorithm consists of four main steps: (1) Selection step includes a leaf of the game tree that is chosen to be expanded and evaluated through Monte-Carlo simulations; (2) Expansion step includes all possible actions for the selected leaf being numerated and added to the tree as child-nodes; (3) Simulation step performing Monte-Carlo simulations (e.g., rollouts) for the selected leaf and all of its child-nodes to obtain an estimate of the state-action value function; and (4) Backpropagation, includes the results of the simulations (e.g., value estimates) that are propagated up the tree structure to update the values of the nodes above the evaluated node.

Thus, there is a need for a need for improved CASP systems that can be used in methods for retrosynthesis and synthesis planning for chemical compounds.

SUMMARY

In some embodiments, a method of determining a synthesis protocol for a reaction pathway of a target molecule can include: providing target compound data of a structure of a target compound; performing a chemical synthesis search with the target compound data for at least one reaction pathway for the target compound; processing the target compound data through a single-step reaction enumeration algorithm to obtain at least one reaction step of the least one reaction pathway, the reaction step having a substrate set of reagents that produce the target compound or a target compound precursor (e.g., intermediate substrate); processing at least one reaction step of the at least one reaction pathway of the target compound with the at least one reaction pathway scoring mechanism model to obtain a reaction step score for each reaction step or each reaction pathway; constructing a plurality of reaction pathways for the target compound based on the at least one reaction step and the at least one reaction step score; providing at least one reaction selectivity filter having a selectivity criteria; filtering the plurality of reaction pathways with the at least one reaction selectivity filter, wherein any reaction pathway violating the selectivity criteria is filtered out of the plurality of reaction pathways; ranking the plurality of reaction pathways to obtain a reaction pathway listing; and providing the reaction pathway listing having the ranked reaction pathways.

In some embodiments, the chemical synthesis search can include: consider the target molecule as a one molecule set; choosing an expansion variant of at least one substrate set of reagents; identify a group of molecules of the at least one substrate set in a current position being building blocks of the target in a reaction step; and scoring the reaction step having the identified group of molecules. In some aspects, a Monte-Carlo Tree Search (MCTS), which is a heuristic search algorithm, is applied as mode of performing the expansion variation from which the expansion variant is chosen.

In some embodiments, the method can include having the target compound data be obtained from a non-transient database by accessing the database and causing the database to transmit the target compound data to an input module of the computing system, which input module loads the target compound data.

In some embodiments, the method can include the computing system accessing a database having chemical reaction data. The computing system performs a chemical synthesis search with the target compound data for the at least one reaction pathway for the target compound. The chemical reaction data is selected based on the target compound data to identify one or more candidate reaction steps of at least one reaction pathway. The computing system saves the chemical reaction data, or loads the data for further processing.

In some embodiments, the computing system can process the target compound data and chemical reaction data through the single-step reaction enumeration algorithm to obtain the at least one reaction step of the least one reaction pathway. The reaction step is obtained to have the substrate set of the reagents that produce the target compound or a target compound precursor. The substrate set of reagents that result in a reaction product can be stored in a reaction step database. The computing system can save the reaction step data for each reaction step or load the data for further processing.

In some embodiments, the computing system can process the at least one reaction step of the at least one reaction pathway of the target compound with the at least one reaction pathway scoring mechanism model to obtain the reaction step score for each reaction step or each reaction pathway. The reaction step score can be calculated based on rewards for favorable reaction parameters. The computing system can save the at least one reaction step score.

In some embodiments, the computing system can construct a plurality of reaction pathways for the target compound based on the at least one reaction step and the at least one reaction step score. Each reaction pathway can include at least one reaction step having a reaction step score. Each reaction pathway score can be obtained for each reaction pathway as a summation of each reaction step score contained in the respective reaction pathway. The computing system can save each reaction pathway score, or provide it for pathway construction or analysis.

In some embodiments, the computing system can access a database having at least one reaction selectivity filter that has a selectivity criteria. The computing system can load the at least one reaction selectivity criteria for processing in a comparison module with each reaction pathway. Each reaction template can be provided that has one or more known reaction violations.

In some embodiments, the computing system compares the plurality of reaction pathways with the at least one reaction selectivity filter by performing a matching protocol with each reaction pathway and the at least one reaction template. The matching protocol can include matching each reaction step with each reaction template and assessing for a violation of the reaction template. As a result, any reaction pathway violating the selectivity criteria is filtered out of the plurality of reaction pathways. The computing system can save the reaction pathways that are not filtered out.

In some embodiments, the computing system compares the reaction pathway score of each remaining reaction pathway after the filtering to obtain the ranking of the plurality of reaction pathways to obtain a reaction pathway listing. The computing system can save the reaction pathway listing, such as on a non-transient storage media of a database. The reaction pathway listing can include links to each reaction pathway data, which fully defines the reaction step in substrate sets and product.

In some embodiments, the computing system provides the reaction pathway listing having at least one of the ranked reaction pathways, which can be provided as a report that is physical or electronic. Each target molecule synthesis scheme is provided with a reaction pathway having each reaction step to synthesize the target molecule. The reaction pathway includes synthesis instructions for synthesizing the target molecule.

In some embodiments, the single-step reaction enumeration algorithm is used for each single reaction step in a reaction pathway. The method can include training the reaction enumeration algorithm with reaction data from a reaction data dataset.

In some embodiments, the pathway scoring mechanism model is configured to provide the reaction step score by at least one of: analyzing each reaction step with a reaction outcome prediction model to obtain a reaction likelihood for each reaction step; looking up each substrate building block of each substrate set of each reaction step from a building block database of the reactions; determining a synthetic accessibility predicted score of each of the reaction steps with a synthetic accessibility prediction model, which provides the predicted scores; determining reaction condition predictions with a reaction condition prediction model, which provides predicted conditions; and determining a pathway score for each reaction step or reaction pathway by: considering availability of building blocks for each reaction step; considering predicted scores for each reaction step from the synthetic accessibility model; considering the reaction likelihood of each reaction step obtained from the reaction outcome prediction model; and considering predicted conditions for each reaction step from the reaction condition prediction model. The method can include processing at least one reaction step of the at least one reaction pathway of the target compound with the at least one reaction pathway scoring mechanism model to obtain a reaction step score for each reaction step or each reaction pathway.

In some embodiments, the method can include a filtering protocol that is performed by comparing the plurality of reaction pathways with the at least one reaction selectivity filter. For example, a matching protocol can be performed with each reaction pathway and the at least one reaction template. In some aspects, the matching protocol includes matching each reaction step with each reaction template and assessing for a violation of the reaction template. Any reaction pathway violating the selectivity criteria can be filtered out of the plurality of reaction pathways. The computing system can save the reaction pathways that are not filtered out.

In some embodiments, the method can include: selecting the target molecule; obtaining at least one transformation suggestions for each reaction step in a reaction pathway, each transformation suggestion being from the single-step reaction enumeration algorithm; picking a selected transformation; identifying a set of intermediate substrates for the selected transformation; and searching a building block database to determine whether building blocks are available for each intermediate substrate for the set of intermediate substrates. In some aspects, the method can further include: if the building blocks are available, then the reaction pathway is output as the final reaction pathway. In some aspects, if the building blocks are not available, then the method comprises determining if a maximum number of reaction steps is exceeded, wherein if the maximum number of reaction steps is exceeded, then the reaction pathway is output as the final reaction pathway, or if the maximum number of reaction steps is not exceeded, then the method picks another reaction pathway or another reaction step.

In some embodiments, the method can include: considering a first reaction step of a first reaction pathway of a first target molecule; and performing a matching protocol that determines whether the first reaction step matches a known reaction template. If the first reaction step matches a known reaction template, then the method determines whether the reaction template has any criteria. If the first reaction step does not match a known reaction template, then the method moves to a second reaction step and performs the matching protocol with the second reaction step.

In some embodiments, a method can include performing a matching protocol that determines whether the first reaction violates a criteria. If the first reaction step matches a known reaction template violation, then the method can determine whether the reaction template has any protection and deprotection steps. If the first reaction step does not match a known reaction template violation, then the method moves to a second reaction step and performs the matching protocol with the second reaction step.

In some embodiments, the method can include determining whether there is a protection reaction and deprotection reaction scheme to overcome the reaction template violation. If the protection reaction and deprotection reaction scheme is available, then the method adds the protection reaction and deprotection reaction scheme to the first reaction step. If the protection reaction and deprotection reaction scheme is not available, then the method excludes the first reaction step from the reaction pathway.

In some embodiments, a pathway scoring routine can be performed to obtain a pathway score. The pathway scouring routine can include assessing the target molecule, synthetic accessibility, and synthetic accessibility increase to obtain the pathway score. The pathway scoring routine can include assessing the number of steps of a reaction pathway to obtain the pathway score. The pathway scoring routine can include assessing final substrates (e.g., reagents), a minimum synthetic accessibility of the final substrates, and the synthetic accessibility increase to obtain the pathway score. The pathway scoring routine can include assessing individual steps and likelihood of successfully completing the individual steps to obtain the pathway score.

In some embodiments, a reaction outcome prediction model is based on a transformer architecture. A method with such an outcome prediction model can include: obtaining a chemical line nomenclature for a source substrate and a target product, wherein characters of the chemical line nomenclature are vectors; performing group-wise positional encodings to the character vectors of the chemical line nomenclature for the source substrate and target product; performing at least one layer of multihead self-attention to character vectors to obtain a character-level representation of each source substrate and target product; performing group-wise multihead attention pooling to the character-level representations to obtain word-level representations of the source substrate and target product; concatenating the character-level representations with the word-level representations of the source substrate and target product to obtain combined representations of the source substrate and target product; performing a multihead attention to the combined representations; determining a probability distribution for the source substrate and target product; and output a reaction likelihood of the source substrate reacting to form the target product based on the probability distribution.

In some embodiments, the single-step reaction enumeration module can be configured for: performing a single-step reaction analysis with an algorithm; performing a pathway scoring function; performing a search with a search algorithm suitable for synthetic pathway planning; processing a reaction outcome prediction module for at least one synthetic pathway; processing at least one synthetic pathway with a post-processing module criteria to filter out violating pathways; and providing at least one reaction pathway.

In some embodiments, the physical target molecule can be prepared with the reaction pathway determined by the system. The method can include: synthesizing the target molecule into a physical form; and validating the synthesized target molecule as being a physical form of the target molecule. In some aspects, the reaction pathway listing is accessed to select a reaction pathway. The method can further include: obtaining a physical form of the substrate set for each reaction step, wherein the substrate step includes reactants that produce an intermediate substrate or the target molecule; reacting the substrate set in reaction conditions to produce a physical form of the intermediate substrate or target molecule; and repeating the reacting until producing the physical form of the target molecule.

In some embodiments, a computer system can include: one or more processors and one or more non-transitory computer readable media storing instructions that in response to being executed by the one or more processors, cause the computer system to perform operations. The operations can include any of the methods or method steps thereof recited herein.

In some embodiments, one or more non-transitory computer readable media can be provided that store instructions that in response to being executed by one or more processors, cause a computer system to perform operations. The operations can include any of the methods or method steps thereof recited herein.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and following information as well as other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

Figure 1:
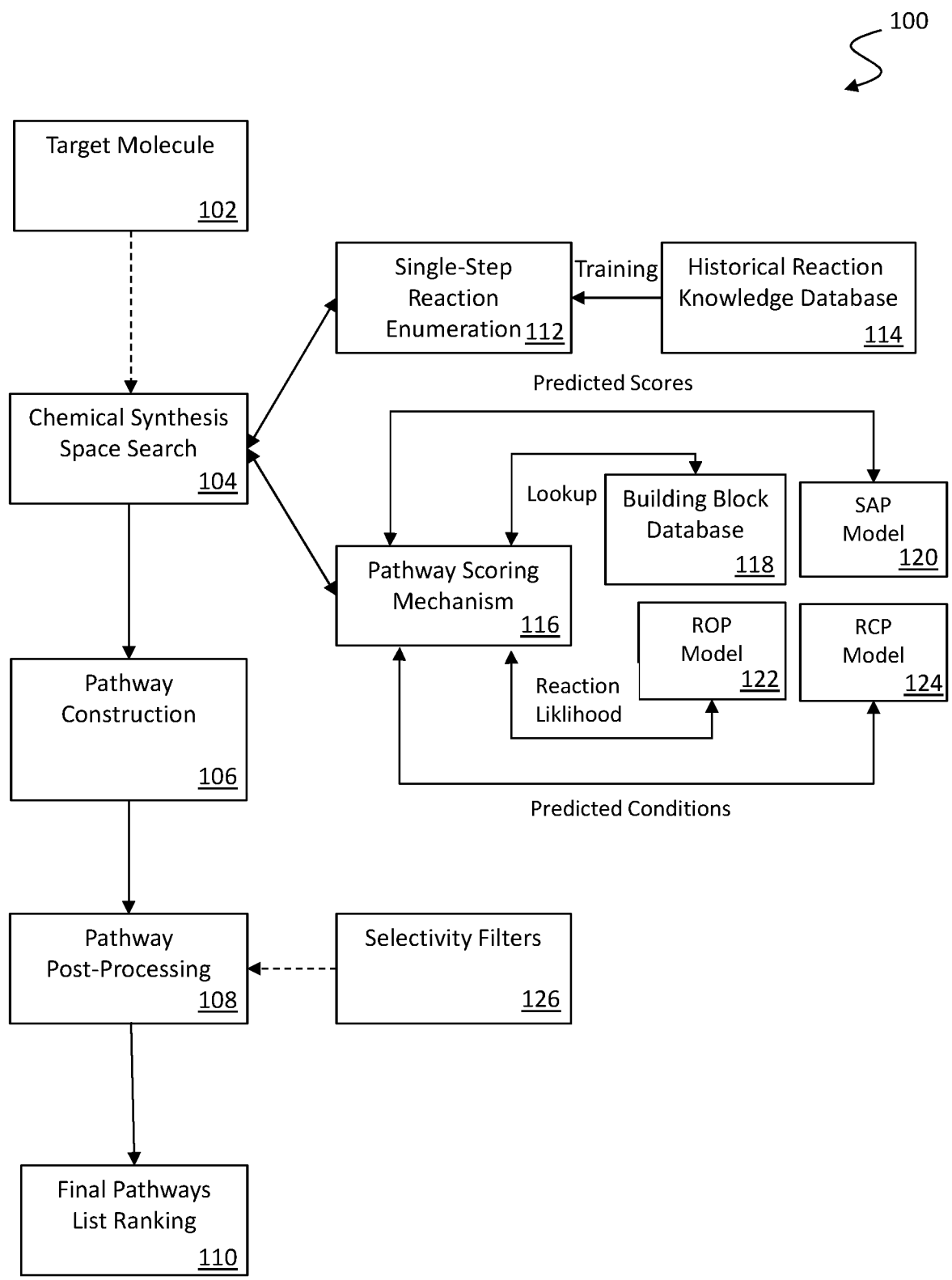
FIG. 1 includes a scheme for a method of synthesis planning.

The elements and components in the figures can be arranged in accordance with at least one of the embodiments described herein, and which arrangement may be modified in accordance with the disclosure provided herein by one of ordinary skill in the art.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Generally, the present technology relates to a computer-aided synthesis planning (CASP) system for synthetic protocol design methods. The synthesis planning can be used in response to a synthesis planning problem for creating a target molecule with a synthesis design protocol. The synthesis planning problem can be defined from a deep learning perspective. For example, the deep learning perspective can be similar to the protocol in a single player game. The synthesis planning protocol can include the following: (1) Position step considers the current set of molecules, where the initial position is defined as the one-molecule set consisting of the target molecule; (2) Action step is defined by choosing one of the expansion variants proposed by the single-step enumeration algorithm; (3) Game ends step occurs when all molecules in the current position are considered to be building blocks or some other stopping criterion is satisfied (e.g., the time limit or maximum number of steps exceeded); and (4) the score step obtains a score that is defined arbitrarily and measures the quality of the obtained pathway and final substrates. In this setting, the heuristic search algorithms (e.g., including MCTS) can be applied to the synthesis planning problem.

In some embodiments, the CASP system can include Artificial Neural Networks (ANNs), which are machine learning models inspired by biological neural networks. Generally, an artificial neuron receives an input signal represented as a N-dimensional real-valued vector, multiplies it by the neuron weight vector which is optimized during the training procedure, and outputs the result after applying a nonlinear function (e.g., activation function) such as a hyperbolic tangent or ReLU (e.g., a function defined as the positive part of an argument). ANN blocks can be arranged into complex and powerful networks capable of solving hard machine learning tasks including regression and classification. Each ANN has input, hidden and output layers. ANNs with one or more hidden layers are called Deep Neural Networks (DNNs).

In some embodiments, the ANNs can be trained with data for chemical synthesis protocols. ANNs utilize data training for a high level performance on a specific task. This is achieved by minimizing the empirical error (or loss) function such as mean squared error for regression tasks or binary cross-entropy for classification tasks. In some aspects, Stochastic Gradient Descent (SGD) based methods are utilized to minimize a loss function. In this case, the backpropagation algorithm can be used to compute a gradient of a loss function with respect to training samples. Then, the ANN weights are updated proportional to the negative of the gradient where the manually chosen coefficient of the proportionality is called learning rate. This process is repeated until the training process converges. A validation step can be used to evaluate the model performance on unseen data.

In some embodiments, the CASP system can computationally process chemical structure data in a graph format. Graph is an abstract mathematical structure that is represented as a set of vertices (e.g., nodes) and a set of links between those nodes (e.g., edges). Graph Neural Networks (GNNs) are ANNs that operate on graph structured data. Graph Logic Networks (GLN) are conditional graphical models built upon graph neural networks that learn when rules from reaction templates should be applied, implicitly considering whether the resulting reaction would be both chemically feasible and strategic.

In some embodiments, the CASP system can utilize an attention mechanism in the DNN. The use of the attention mechanism in DNNs allows them to exchange information between three kinds of vectors, such as Key vectors, Value vectors and Query vectors. The computation of attention weights is performed by applying the softmax function to the scalar products of Key vectors and Query vectors. After that, the attention vector is computed as a convex combination of the Value vectors, which are taken with their respective attention weights and computed. The attention is called a multihead attention (MHA) if the vectors are partitioned into a number of parts, which are then passed into separate attention blocks (e.g., heads) with the results being concatenated after the processing. An attention block is called a self-attention block if the Key vectors, Value vectors and Query vectors are identical.

The multihead attention can be performed by a module for attention mechanisms, which runs through an attention mechanism several times in parallel (e.g., K times, where K is an integer). The independent attention outputs are then concatenated and linearly transformed into the expected dimension. Intuitively, multiple attention heads allows for attending to parts of the sequence differently (e.g. longer-term dependencies versus shorter-term dependencies).

In some embodiments, the attention layer can get input in the form of three parameters, which are known as the Query, Key, and Value. All three parameters are similar in structure, with each word in the sequence being represented by a vector. The input sequence is fed to the input embedding and position encoding module, which produces an encoded representation for each word in the input sequence, wherein the encoded representation captures the meaning and position of each word, wherein each word is a molecule in a reaction step. This is fed to all three parameters, Query, Key, and Value in the self-attention in the first encoder which then produces an encoded representation for each word (e.g., molecule) in the input sequence (e.g., reaction), that now incorporates the attention scores for each word. As this passes through all the encoders in the stack, each self-attention module adds its own attention scores into each word representation. In the decoder stack, the target sequence is fed to the output embedding and position encoding module, which produces an encoded representation for each word (e.g., molecule) in the target sequence (e.g., reaction step) that captures the meaning and position of each word, which is the place of the substrates (e.g., reagents) in the reaction step of the pathway to obtain the target molecule. This is fed to all three parameters, Query, Key, and Value in the self-attention in the first decoder which then also produces an encoded representation for each word (e.g., molecule) in the target sequence (e.g., reaction step), which now incorporates the attention scores for each word. In some aspects, after passing through the layer normalizer, encoded representation of each compound (e.g., word) is fed to the Query parameter in the encoder-decoder attention module in the first decoder. Along with that, the output of the final encoder in the stack is passed to the Value and Key parameters in the encoder-decoder attention module. The encoder-decoder attention module is therefore getting a representation of both the target sequence (from the decoder self-attention) and a representation of the input sequence (from the encoder stack). It, therefore, produces a representation with the attention scores for each target sequence word (e.g., molecule) that captures the influence of the attention scores from the input sequence (e.g., reaction step) as well. As this passes through all the decoders in the stack, each self-attention and each encoder-decoder attention also add their own attention scores into each word's representation (e.g., chemical representation).

The softmax function takes as input a vector z of K real numbers, and normalizes it into a probability distribution consisting of K probabilities proportional to the exponentials of the input numbers. That is, prior to applying softmax, some vector components could be negative, or greater than one; and might not sum to 1; but after applying softmax, each component will be in the interval [0,1], and the components will add up to 1, so that they can be interpreted as probabilities. Furthermore, the larger input components will correspond to larger probabilities.

In some embodiments, the CASP system can include a transformer architecture, which is a DNN architecture used primarily for sequence-to-sequence translation and language modeling. The transformer architecture employs self-attention blocks to construct both the decoder and the encoder networks. Given the source language sentence the encoder is used to obtain a set of representations for each of the input symbols. After that the decoder is used to construct the sentence in target language sequentially in an autoregressive fashion. The sequence-to-sequence model architecture for aggregating both character-level and word-level representations through multihead self-attention and multihead attention pooling can be performed as described in connection with the ROP model.

In some embodiments, the pathway scoring function can be applied to the reaction outcome prediction problem. Also, the pathway scoring function can be applied to the estimation of the likelihood of a molecule being the product of the reaction between two given substrates (e.g., reagents). This can be a single step in a reaction pathway that includes multiple steps. The individual reaction steps can be generated and scored. Accordingly, the reaction pathway to obtain the target product can be a sum of the individual reaction step scores.

FIG. 1 includes a schematic representation of a CASP system 100 configured for performing a scheme of a synthesis planning method. As shown, the CAPS system 100 includes a target molecule module 102, which is configured for receiving input of the desired target molecule, automatically determining the target molecule, or other way of making the determination of the target molecule. The target molecule data is provided from the target molecule module 102 to the chemical synthesis space search module 104, which is configured to implement and assess a chemical search for the chemical synthesis of the target molecule in databases related to chemical synthesis. The chemical synthesis space search performs a search for a synthesis pathway of the target molecule. The determined chemical synthesis data can be provided from the chemical synthesis space search module 104 to the pathway construction module 106, which can retain the data for the reaction pathway of the synthesis for the target molecule. The data of the reaction pathway of the synthesis of the target molecule can be provided from the pathway construction module 106 to a pathway post-processing module 108. The pathway-post processing module 108 can optimize the pathway of the synthesis for the target module by various optimization protocols or filtering protocols. The data from the pathway post-processing module 108 can then be provided to the final pathways list ranking module 110, which ranks the listing of pathways from the pathway post-processing module 108. The final pathways list ranking may be obtained by scoring certain pathways based on criteria for chemical synthesis. Accordingly, a ranked list of the pathways can be provided by the module 110 so that the decided pathway with the best score can be provided. The best pathway can then be implemented with real reagents to be performed with a real synthesis to obtain the physical target molecule. This allows the CASP system 100 to provide the best pathway or a listing of the pathways in a ranking, which allows for the desired pathway (e.g., best based on criteria) to be used for synthesizing the physical target molecule.

The chemical synthesis space search module 104 can either include a number of submodules or be operably coupled with a number of other modules in order to implement the functionality. That is, the modules that operate to search the chemical synthesis space may either be submodules or distinct separate modules.

A single-step reaction enumeration module 122 is provided for implementation of the chemical synthesis space search. The single-step reaction enumeration model 122 can include an algorithm that can be used for providing the reaction steps that are generated. The single-step reaction algorithm module 112 can be trained by single-step reaction data that is provided by a historical reaction knowledge database 114. The historical reaction knowledge database 114 can include data of chemical reactions, such as including single-step reactions from a substrate set (e.g., reagents) to a reaction product. The single-step reaction data can then be used to train the single-step reaction algorithm module 112 to result in the model being trained. The trained module can then be used to provide generated single-step reaction data to the chemical synthesis space search module 104. Based on the target molecule data or other reaction data for the target molecule in the chemical synthesis space search module 104, the single-step reaction enumeration module 112 can be operated to provide generated single-step reaction data.

A pathway scoring mechanism module 116 is provided for implementation of the chemical synthesis space search, which can be used along with the single-step reaction algorithm 112 or in place thereof. The pathway scoring mechanism module 116 is configured for scoring a reaction pathway to provide a value for comparison of each proposed reaction pathway. The scoring can be weighted based on desirable synthesis, such as low complexity, low steps, and available reagents. The pathway scoring mechanism module 116 can be operably coupled to a building block database 118, which allows for a lookup protocol to look up different chemical entity building blocks, and to select building blocks for the pathways being scored. Also, a synthetic accessibility prediction (SAP) model 120 (e.g., module operating the model) can be included that provides a model for the prediction of synthetic accessibility of the target molecule. The SAP model 120 can perform a protocol based on synthetic accessibility of the reaction pathway for a SAP model 120, which can include the protocol of International PCT Application No. PCT/IB2021/054029, which is incorporated herein by specific reference in its entirety. The pathway scoring mechanism module 116 can obtain the synthetic accessibility data from the SAP model 120. In some instances, the pathway scoring mechanism can obtain predicted scores from the SAP model 120, which can be obtained from the predictions of the model. The predicted scores can be used in the pathway scoring mechanism 116.

The pathway scoring mechanism 116 can also be operably coupled with a reaction outcome prediction (ROP) model 122 (e.g., module operating model). The ROP model 122 can be used for predicting reaction outcomes, and providing the same to the pathway scoring mechanism module 116. The predicted reaction outcomes can be modeled for the likelihood of the reaction outcome, which can provide an indication of the success for scoring purposes. The better scored reactions can have higher likelihood of a better reaction outcome. The predicted outcomes can be scored by the pathway scoring mechanism 116.

The pathway scoring mechanism 116 can also be operably coupled with a reaction condition prediction (RCP) model 124 (e.g., module operating model). The RCP model 124 can be used for predicting reaction conditions, and providing the same to the pathway scoring mechanism module 116. The predicted condition outcomes can be modeled for the likelihood of the reaction condition for synthesis condition purposes, which can provide an indication of the success for scoring purposes. The better scored reactions can have higher likelihood of a better reaction condition. The predicted conditions can be scored by the pathway scoring mechanism 116.

The pathway scoring mechanism 116 can process the single-step reaction data through the analysis of availability of building blocks from the building block database 118 (lookup), SAP model 120 (predicted scores), ROP model 122 (likelihood of reaction), and RCP model 124 (predicted conditions). The pathway scoring mechanism 116 can then provide the scoring data for the reaction pathways to the chemical synthesis space search module 104, which can then compile the data. The synthesis space data for the pathways can then be provided to the pathway construction module 106.

Once the pathways are constructed, such pathway data can be provided to the pathway post-processing module 108. In some instances, certain selectivity filters are applied to the pathways by the selectivity filter module 126. The selectivity filters can filter the reaction pathways according to certain criteria. The criteria can include a complexity value of the required reagents, a complexity value for the required conditions, and/or a complexity value for the required numbers of steps, or other criteria with the goal of simpler reactions.

The pathway post-processing module 108 provides a listing of one or more final pathways to the final pathways list ranking module 110 in order to rank the reaction pathways. The final pathways list ranking may be obtained by scoring certain pathways based on criteria for chemical synthesis. Accordingly, a ranked list of the pathways can be provided by the module 110 so that the decided pathway with the best score can be provided. The best pathway can then be implemented with real reagents to be performed with a real synthesis to obtain the physical target molecule. This allows the CASP system 100 to provide the best pathway or a listing of the pathways in a ranking, which allows for the desired pathway (e.g., best based on criteria) to be used for synthesizing the physical target molecule. Usage of input databases includes historical reaction knowledge database 114, commercial building blocks database 118 and selectivity filters database (e.g., selectivity filters 126). Thus, the system 100 can be used for finding reaction pathway solutions to the problem of synthetic pathway planning for chemical compounds, including but not limited to small molecules.

The overall computer-aided synthesis planning system methodology as described herein, can include: operation of a single-step reaction enumeration algorithm; operation of a pathway scoring function; operation of a search method; operation of a reaction outcome prediction module; operation of a synthetic accessibility prediction module; and operation of a pathway post-processing module. The operations can be facilitated by usage of input databases including historical reaction knowledge database, commercial building blocks database and selectivity filters database. The method can be used to generate a synthetic pathway plan for a target chemical compound, which can include small molecules.

The pathway scoring mechanism can function as described herein. The pathway scoring mechanism can consider a synthetic accessibility increase term that is calculated using the predicted scores of the synthetic accessibility prediction module. Also, the pathway scoring mechanism can consider a reaction likelihood term that is calculated by using the data of the reaction outcome prediction module. The pathway scoring mechanism can consider a pathway length term, where longer pathways are less desirable than shorter pathways. All of these elements can be considered separately or together in any combination for obtaining a pathway score. Therefore, the pathway scoring mechanism can consider any combination of these terms into an aggregate formula, including but not limited to a linear combination of them.

The chemical synthesis space search module 104 can be used to assess the chemical synthesis space, which can be known chemical reactions or other parameters related to synthesis. The CASP system can be configured with a search algorithm in order to search the chemical synthesis space. Accordingly, the chemical synthesis space search module 104 can include a generic search algorithm that is capable of constructing reaction pathways with the lowest possible values (e.g., minimum) of the score for the pathway. The simplest option is to use ordinary graph traversal methods, such as depth-first or breadth-first searching. The synthetic pathway planning can use more effective search algorithms for reaction pathways with at least 3-4 steps. The effective search algorithms can reduce the time to find the solutions compared to the generic search algorithm because of the high branching factors associated with the problem.

In some embodiments, the chemical synthesis space search module 104 can utilize effective search algorithms that are suitable for synthetic pathway planning. Some example employ heuristics, which are functions that try to infer the utility of each step by either predicting it or running a large number of simulations to estimate the utility in a Monte Carlo method fashion. Thus, the MTCS protocols can be used. Such algorithms typically traverse the search space in an iterative manner trying to follow the most promising paths (e.g., exploitation) and simultaneously follow the untested paths (e.g., exploration) to test if they are actually promising.

The chemical synthesis space search module 104 can include the following features. The chemical synthesis space search module 104 can be configured to obtain the target molecule as input data. The module 104 can be configured with instructions for performing a search space protocol, which can be defined implicitly by the single-step reaction enumeration module 112. The single-step reaction enumeration module 112 is descried herein, which includes an algorithm for generating single reaction steps. The chemical synthesis space search module 104 includes the target molecule as a starting point, which is used to determine which reactions and intermediate substrates are useful. The reactions in a reaction pathway can be probed by the single-step reaction enumeration module 112 that is trained with the historical reaction knowledge database 114. Also, the SAP model 120 with predicted scores, ROP model 122 with reaction likelihood, and the RCP model 124 with predicted conditions can be used for probing the reactions in a reaction pathway.

A pathway scoring function, also referred to as a pathway scoring mechanism 116 can be used to provide scores for the reaction pathways. The pathway scoring can be performed as described herein. The chemical synthesis space search module 104 can include an algorithm that is configured to return a tree of all choices for reaction pathways and reaction steps that were tested during the search. Additionally, the reaction pathways and reaction steps can be provided with scores of each reaction step at each level assigned to the overall reaction pathway. These scores can be obtained according to the estimated utility of each particular reaction step. It is expected that following the highest scored options at each level leads to the pathway with the highest observed score during the search procedure.

The single-step reaction enumeration module 112 can be used for analysis of reaction pathways and individual steps based on an algorithm being trained with historical reaction knowledge data from the database 114. The single-step reaction enumeration module 112 can be a specialized component module with the algorithm for single reaction step generation. The single-step reaction enumeration module can include an algorithm, and configured as follows. The single-step reaction enumeration module 112 takes a single molecule (e.g., target molecule) and a natural number k as input. The single-step reaction enumeration module 112 generates a list of possible single-step reactions, which can include substrate sets (e.g., reactants) for each of the reactions to obtain a single step reaction product. The reaction step generation can be performed explicitly by exhaustively enumerating the reactions. Also, the generation can be performed implicitly by using techniques, such as beam-search. The result is a list of possible single-step reactions in the form of substrate sets and the reaction product for each of the reaction steps. The substrate sets can include the reagents for a reaction step, and can also include the one or more products (e.g., usually a main product). The substrates can be intermediate substrates that produce intermediate products, which intermediate products can be substrate sets reacted to form the target molecule. The single-step reaction enumeration module 112 generates reaction suggestions that are scored by their applicability, sorted in descending order, and the first k (e.g., arbitrary or defined) value are taken and returned as output for possible reaction steps along with the scores for each reaction suggestion. As used herein, the substrate set can be reacted to obtain the reaction product. Each reaction step can include the substrate set and reaction product.

The single-step reaction enumeration algorithm can be used as a template-based model based on deep neural networks with SMILES strings or structural properties of molecules or biochemical properties of molecules or their molecular graphs as input. In some aspects, the single-step enumeration algorithm is a template-free model with SMILES strings or structural properties of molecules or biochemical properties of molecules or their molecular graphs as input. In some aspects, where the single-step enumeration algorithm is the Graph Logic Network (GLN).

In some embodiments, the search method is a Monte-Carlo Tree Search with a selection policy based on the single-step enumeration algorithm.

In some embodiments, the synthetic accessibility scoring is based on a fragment-based method. In some aspects, the synthetic accessibility scoring is based on a deep neural network with SMILES strings or structural properties of molecules or biochemical properties of molecules or their molecular graphs as input.

In some embodiments, a term for reaction difficulty is included in the score for each reaction pathway. In some aspects, the reaction difficulty prediction is based on a deep neural network with SMILES strings or structural properties of molecules or biochemical properties of molecules or their molecular graphs as input.

In some embodiments, the single-step reaction enumeration module 112 can adhere to the aforementioned feature requirements, which can be considered to be a neural network that broadly falls into two categories: (1) template-based neural network; and (2) template-free neural network. Template-based neural network methods can be operated to extract reaction templates from the reaction database (e.g., 114) and can be trained to prioritize such templates according to their applicability to the given target molecule. The template-free neural network methods do not use any reaction templates, but instead are trained to directly generate the substrate set given the desired product. The template-free neural networks can include either sequence-to-sequence models or graph editing models. Any module that adheres to the aforementioned design features may be used in the single-step reaction enumeration module 112.

In some embodiments, a chemical line nomenclature can be converted to graph data, or vice versa. That is, data in one format in a module may be converted to a different format for processing in a different model. For example, the ROP model 122 can be performed with chemical line nomenclature (SMILES), while the SAP model 120 can use graph data. Therefore, a converter can be included in an module to get the appropriate form for processing.

Figure 4:
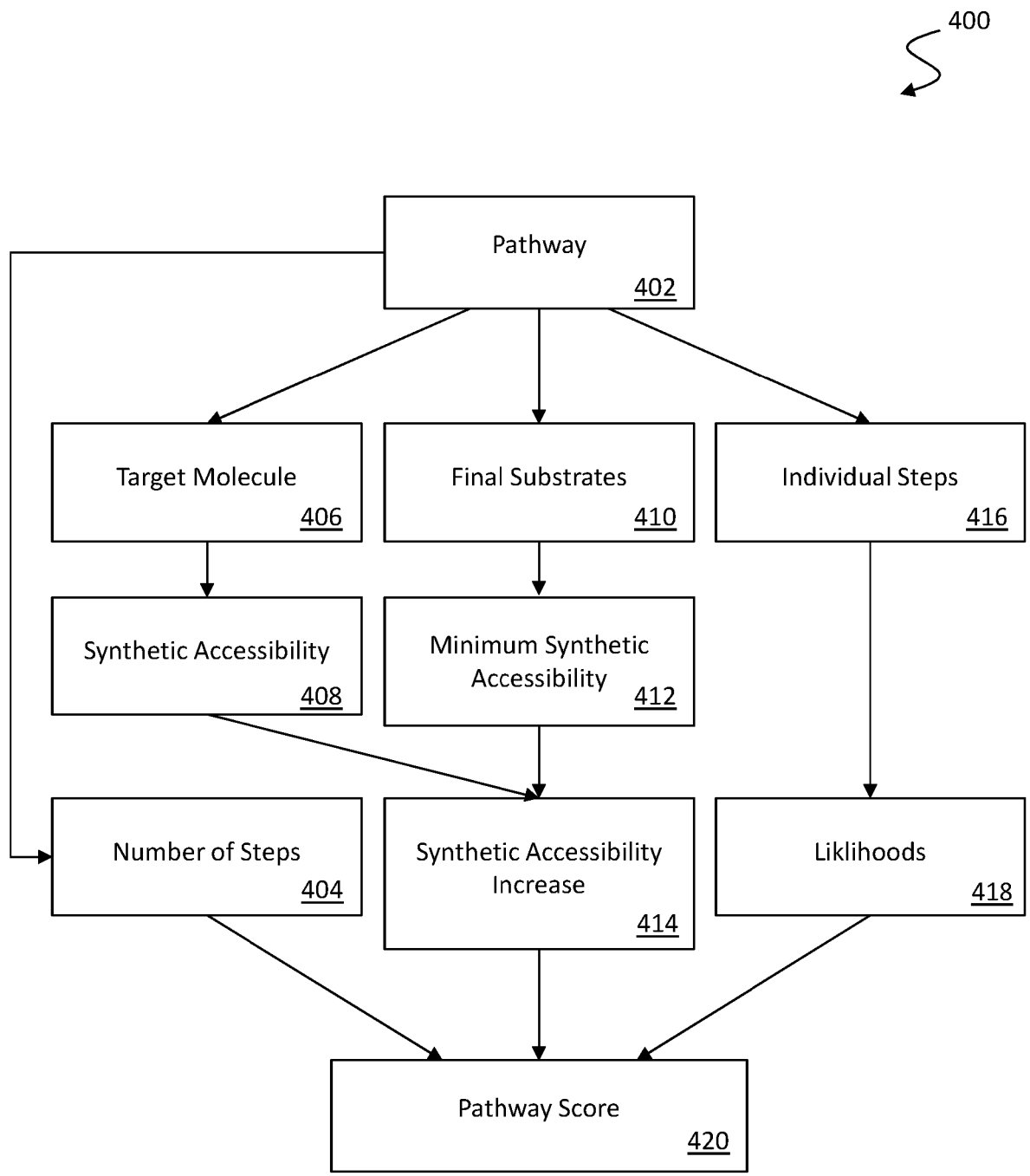
FIG. 4 includes a scheme of a pathway scoring routine that can be used as the reward to optimize a reaction pathway.

The pathway scoring mechanism module 116 can be used for scoring reaction steps. To find the optimal reaction pathway the CASP system 100 can define what optimal means. The reaction pathway is called optimal when it delivers a minimum to the scoring function in the module 116 as specified as the part of the task. During the search and simulations, the pathway scoring function is calculated in the following manner (see also FIG. 4). The reward is only calculated for the whole pathway, which can be at the end of each single simulation after the terminal state of the target molecule is reached. The SAP model 120 can be used to calculate synthetic accessibility scores for the initial target molecule and the substrates for each reaction step. The substrates can be intermediate substrates involved in the analysis, or can be final substrates for at least one reaction step. A synthetic accessibility increase can be calculated as the difference between the minimum substrate accessibility score and the target molecule accessibility score. For each of the individual steps, the likelihoods of the respective reactions are calculated using the ROP model 122. The reward can be calculated as a combination of the number of steps, synthetic accessibility increase and likelihoods of reaction steps, as shown in FIG. 4 and described herein.

The reaction outcome prediction (ROP) model 122 can be used for reaction analysis. The ROP model 122 is configured to be a kind of "reverse" model for the single-step reaction enumeration module 112 that is configured to verify the suggestions thereof. That is, the ROP model 112 can verify the output of the single-step reaction enumeration module 112. The reaction outcome prediction cam be performed as an easier task than retrosynthesis prediction (e.g., SAP model 12). The ROP model 122 can predict the primary product from a given the set of reactants in a reaction step. The ROP model 112 can analyze a given the set of reactants and another molecule (e.g., the "supposed product" or target molecule or intermediate product), and output the likelihood of the reaction step occurring with these reactants (substrate set) to produce this molecule (e.g., target molecule or intermediate product). The ROP model 122 can be configured as a neural network based on encoder-decoder Transformer architecture for sequence-to-sequence machine learning tasks. The ROP model 122 is provided with SMILES (e.g., or other chemical line notation) representations of reactants separated from each other by dots. The encoder of the ROP model 122 can be used to obtain a set of representations for each of the input symbols except for the dots. After that, the decoder of the ROP model 122 is used to construct the product SMILES from these input symbol representations in an autoregressive fashion.

Figure 5A:
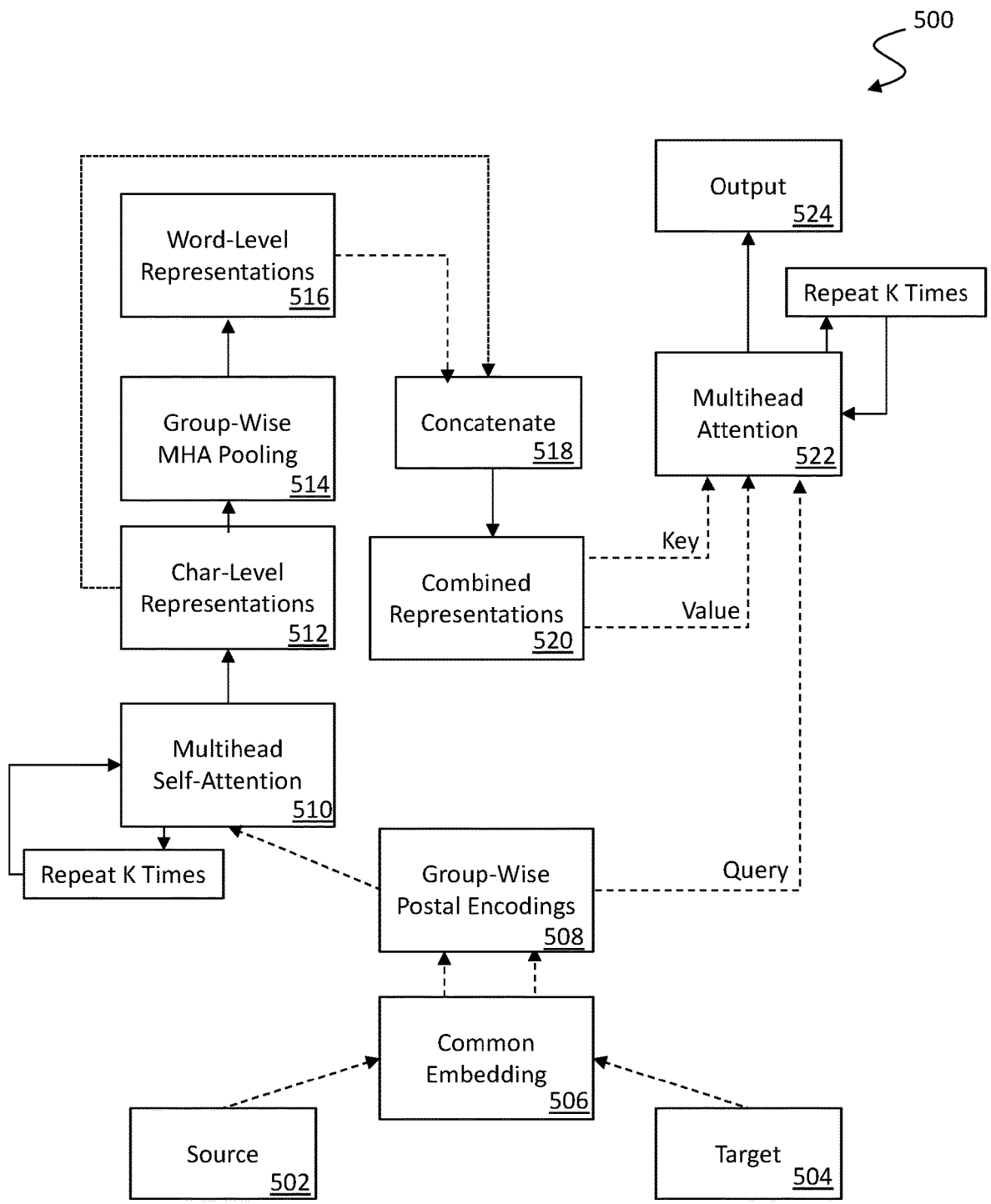
FIG. 5A includes a scheme for a method of reaction outcome prediction modeling based on Transformer architecture.

In some embodiments, the difference between the ordinary Transformer architecture for sequence-to-sequence learning and the present ROP model 122 is the permutation invariance with respect to the permutations of input reactants in the ROP model 122. On the other hand, the ordinary Transformer's predictions are generally permutation-dependent. For ROP model 122, a special group-wise multihead attention pooling layer is added, which aggregates the character-level representations of symbols into word-level (e.g., where "word" actually means a molecule) representations by applying multihead attention to the character-level representations as Keys and Values, while using a trainable Query vector. Thus, applying such an attention block to the character-level representations of characters that constitute the SMILES string for a single molecule results in a single vector that represents the molecule as a whole. FIG. 5A shows an example. Also group-local positional encodings are used in the ROP model 122 instead of usual positional encodings. The ROP model 122 works almost the same, but instead of global positions in the string of concatenated reactants it uses for each character its position in its respective molecule SMILES. After the word-level representations are calculated, they are concatenated with character-level representations to obtain combined word-character representations, which are then in turn used as Key-Value pairs along with product SMILES characters in another layer of multihead attention between encoder and decoder.

The synthetic accessibility prediction (SAP) model 120 can be used for providing predicted scores of reaction pathways and reaction steps. The SAP model 120 can be provided as a component module of the CASP system 100. The SAP model 120 is configured to guide the search procedure in the direction of compound sets that are easier to synthesize. The compound sets can be the reagents that are reacted together to form an intermediate or a product of a reaction step. The compound sets can be obtained from analysis of the target molecule, which is broken down into is constituent parts. Accordingly, high synthetic accessibility for easier to synthesize compounds can be advantageous for reaction pathway design. This allows for the SAP model 120 to implement a reducing function for reducing the task of synthesizing the target molecule, which can include reducing the task for synthesizing or obtaining any reagent in the synthesis pathway. The SAP model 120 can provide scores for reaction pathways in order to identify the reaction pathways with the favorable scores. The SAP model 120 can analyze the initial target product, and then determine substructures that can be readily synthesized or obtained. The reaction can then couple the substructures to form a more complex target product. As such, the reaction pathways with easy to obtain and use reagents can have favorable scores. The goal for scoring is to identify a reaction pathway to synthesize molecules that are simpler. The SAP model 120 can be configured to comply with the following requirements. The SAP model 120 can take a single molecule (e.g., in any convenient representation) as input. The SAP model 120 can be configured to return a real number that can be interpreted as the difficulty of synthesizing the given module. The score can be defined as the bigger the output number the harder the molecule will be to synthesize. Therefore, low SAP scores can be preferable than higher SAP scores. However, lower or higher scoring can be arbitrary, where the present techniques can use "favorable" or "unfavorable" comparisons for scoring. The scoring can then be an arbitrary value indicated as more favorable or less favorable.

In some embodiments, the SAP model 120 can be configured to provide different approaches to solving this task. The SAP model 120 can analyze different reaction paths for higher SAP scores, where higher scores can be less favorable. In some aspects, the SAP score can be lower if the target molecule is easy to synthesize due to there being a given large database of building blocks that contains a lot of molecules with similar substructures as the target molecule. Here, lower scores can be more favorable. These substructures can be introduced from these building blocks through a short chain of reactions. The reaction sequence using available substructures of the target sequence can be scored lower when the reactions are in simple conditions and higher when in complex conditions. The molecule of interest can be broken down into a set of fragments (e.g., substrates) according to a specified list of rules. The rules can be defined by the user or be defined by chemical synthesis requirements. For each fragment, its frequency in the database is calculated. The obtained frequencies can be aggregated with some hand-crafted features, such as the number of ring structures in the molecule, in order to produce a single numeric score.

In some embodiments, the SAP model 120 can be configured with neural networks to predict the synthetic accessibility (e.g., SAP score) directly from its representation, where the substructures of the target molecule are defined. The methods for training such SAP model 120 can be configured to train them to infer the difficulty in data-driven fashion from a corpus of reactions (i.e., the historical reaction knowledge database 114) by assuming that generally the product of a reaction step is less synthetically accessible than all of the reactants in this reaction. This is because the reactants exist, whereas the product must be produced which requires some effort.

The reaction condition prediction (RCP) model 124 can be configured similarly to the ROP model 122 in that the data is processed to determine the likelihood of a reaction condition for a reaction step. The data for reaction conditions can be used for the reactions to determine the type of condition that is used for a particular reaction of two reactants (e.g., substrates). Accordingly, the RCP model 124 can provide the data for the likelihood of the reaction condition complying with one or more reaction conditions, such as avoiding extreme reaction conditions. Then, the pathway scoring mechanism 116 can provide a reaction score for the reaction condition of at least two substrates.

The RCP model 124 can also be configured similarly to the SAP model 120, and configured to provide the predicted conditions for a reaction, such as the conditions for a reaction between two substrates to a product. The reaction conditions of known reactions can be used for reaction training. For example, the reaction conditions associated with a certain substrate can be used for training product outcomes for the conditions of the reaction. The conditions can thereby be a parameter for the present technology along with the reactive substrates. The historical reaction knowledge database 114 can also include data for reaction conditions for the historical reactions. As such, the reaction conditions can be a variable that is treated in the single-step reaction enumeration module 112, and can be part of the chemical synthesis space search. The conditions can be utilized for analysis so that reactions with hard conditions are less favorable than reactions with easer conditions. For example, extreme temperatures or pressures, or reactions outside of the feasible limits can be omitted. The training with reaction conditions for successful reactions, such as those with the identified reaction substrates for a certain target, can allow for improvements based on selecting for suitable conditions, from solvent systems, catalysts, temperature requirements, pressure requirements, or other factors.

In some embodiments, a method for identifying reasonable reaction conditions can include searching for a similar reaction in the literature (e.g., database) and employ exactly the same reaction conditions or slight modification, which can be referred to as the nearest-neighbor approach. The RCP model 124 is can be successful with a database of known reactions that is sufficiently large and densely populated, which can be performed with optimized search strategies (e.g., using a ball tree). Also, if reaction condition information in the nearest-neighbor reaction is not present (i.e., data is incomplete), that information may be predicted based on other similar reactions.

In some embodiments, the RCP model 124 can predict reaction conditions based on the following information. The RCP model 124 can be trained with any published method that accurately predicts partial or complete reaction conditions (e.g., catalysts, solvents, reagents, and temperature). The reaction conditions can be for the particular substrate or substrate set (e.g., reagents), or suitable for use with a very large reaction corpus of substrates. The RCP model 124 can consider the compatibility and interdependence of chemical context and temperature, which can be structurally and chemically based. the RCP model 124 can be configured to perform a quantitative evaluation of reaction condition predictions for a substrate set, which can be tailored to the substrate set or based on a large-scale reaction data set. The data sets can be parsed to identify similar substrates or substrate structures, which can infer similar reaction conditions. The RCP model 124 can be configured to search through a machine readable large data set that is available with catalysts or solvents or reagents classified into different types. For the similarity-based approaches for condition predictions, the RCP model 124 can quantitatively assess the level of "correctness" of conditions when comparing entire sets of conditions associated with different literature reactions. The RCP model 124 can determine whether a condition representation is too general, such as manually encoded types/groups, and that it might not fully characterize functionality, and such condition may receive a low score or otherwise marked as unfavorable. The RCP model 124 may determine that a reaction condition is too specific, the entire condition from other reactions, or that it does not provide further information about chemical similarity, and such reaction conditions can be receive a low score or otherwise marked as unfavorable. The reactions that are suitably related to the substrate set for producing a product can receive higher scores or be marked as being favorable.

The RCP model 124 can be configured as a neural-network-based model to predict suitable reaction conditions for organic transformations of a substrate set to produce a product (e.g., intermediate products or target product). The model can be trained on roughly 10 million examples a reaction database to predict the chemical species used as catalysts, solvents, reagents, and an appropriate temperature for the reaction. Prediction results are evaluated both quantitatively, using a variety of accuracy metrics, and qualitatively, using multiple sets of representative examples. It is also demonstrated that the RCP model 124 learns the similarity of the chemical context (e.g., different solvents/reagents) exclusively from reaction data.

The pathway construction module 106 can be operated performed pathway construction after the search run of the chemical synthesis space search function. The pathway construction can use the reaction pathways that are identified and scored in the chemical synthesis space search. The single-step model can provide transformation suggestions, such as for each reaction step or a multi-step reaction pathway. Then, the transformations are picked to identify the reaction steps. The intermediate substrates that are used as reagents are then identified for the reaction steps. These reagents are analyzed, such as with the database 114, to determine if there are building blocks readily available. If there are no building blocks, the intermediate substrates need to be synthesized, which can be studied for the number of steps to make the intermediate substrate. If it takes too many steps, that reaction pathway is scored poorly or removed from consideration. The reaction steps that have intermediate substrates for reagents that are easily obtained as building blocks can be better for the output of the final pathway.

The pathway post-processing module 108 can be operated to filter out some of the pathways. After the newly constructed pathways were obtained, they can be analyzed and observed to detect selectivity problems. Some reaction pathways can have a lot of selectivity problems due to the method of their construction, which does not take into account anything except the geometric information about the molecule. The single-step enumeration module 112 may also be unable to detect such problems due to any lack of training data that can be used to train to avoid such mistakes. Therefore, training to avoid the mistakes can be helpful in reaction pathway construction and analysis. In order to improve the reaction pathways that are ranked to have better quality reaction pathways, the filtering protocol can selectively remove pathways that fail for not meeting the defined criteria. The pathway post-processing stage can be used to fix most of the problems that are observed in the raw pathways.

The following example can be used for each reaction step of a synthetic pathway. The reaction step is compared to the manually devised set of rules defined as a collection of tuples. Each tuple consisting of a reaction template (e.g., as a SMARTS string) and a list of selectivity filters defined by a SMARTS template. Also, it can be useful to have a protection/deprotection reaction template. If the reaction step matches any rule, the filters of this rule are checked. If any filter violation is detected, the availability of protection/deprotection is checked to overcome the violation. If no protections are available, the pathway is rejected. Otherwise, for protection and deprotection there are two extra synthesis steps that are inserted into the pathway around the current step, which are the protection and deprotection reactions.

Figure 2:
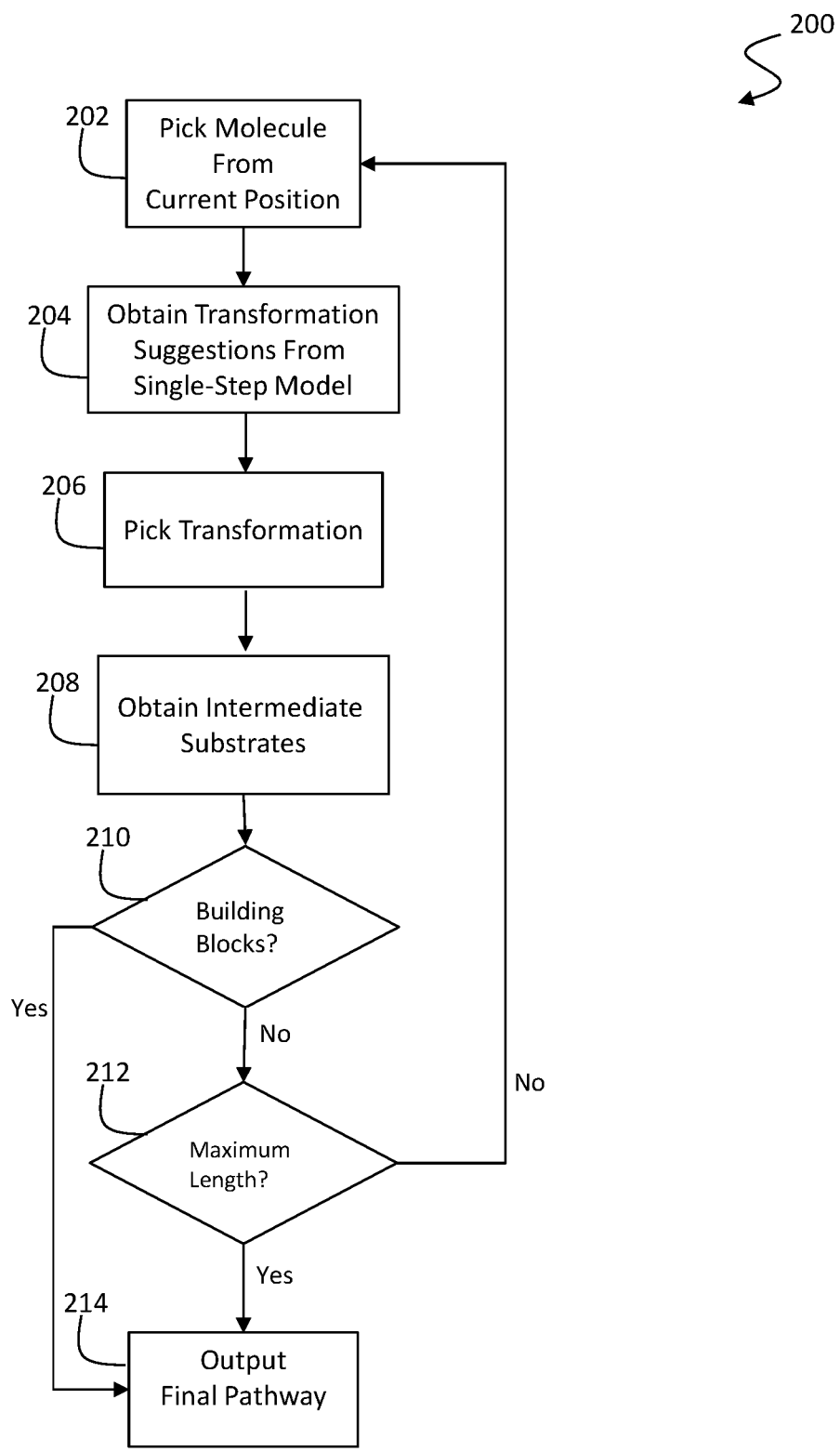
FIG. 2 includes a scheme for a method for a base pathway construction routine after performing a search run.

Computer-assisted synthesis planning (CASP) system can be used to determine the reaction pathway for a target molecule. The overall method is based on the description of modern CASP systems. Overall, the scheme of the CASP system is presented in FIG. 1. The system is operated by following the usual interpretation of synthesis planning as a single-player game. The system can use a generic search method to guide the synthesis pathway reaction planning process. The reward is used to score the generated pathways, such as with the pathway scoring mechanism 116. The chemical synthesis space search is performed by the target molecule being passed through the search-based planning stage. As a result, a search tree is obtained with scores assigned to each of the actions on all levels of the tree. The search tree includes the reaction pathways being scored. The reaction pathway construction is performed by using the search tree obtained from the previous step. The final pathway is constructed by traversing the tree until the current position is composed entirely of building blocks or the maximum pathway length is exceeded. FIG. 2 provides an example operational method. Pathway post-processing is the stage where the constructed pathway is refined to ensure the selectivity of the synthesis steps. The final pathway is returned, such as being saved, provided in a report, or used as instructions in a chemical synthesis protocol. For example, the reaction pathway can be followed with real reagents and chemical reactions to obtain the target molecule. The target molecule can then be analyzed and validated for correct chemical structure (e.g., NMR, mass-spectroscopy, biological assay, etc.).

The data used in the methods can be chemical data. For example, there are three main types of data collections that can be used in the CASP system and methods. This kind of data can be supplied for the CASP system to function properly.

In some embodiments, historical reaction knowledge database data can be used. This database is a collection of reactions for the single-step reaction enumeration algorithm to be trained on. The reactions can be defined as Reaction SMILES (Reaction SMARTS, SMIRKS) strings and contain valid reactants and a product. The examples of such databases are the commercial Reaxys by Elsevier and open USPTO-50K dataset based on reaction data extracted from the database of patents.

In some embodiments, a building block database can be used to obtain building block data. The building blocks are commonly available and easy to purchase chemical compounds. The list of these compounds can be used as a variable input to the system based on various factors, such as availability, cost, or other. For example, the criteria can be the supplier that an entity would like to work with in order to obtain reaction components for the synthesis. The building block data can include a list of molecules (e.g., in SMILES representation), possibly along with their catalogue identifiers and current prices to quickly relay this information to the chemical vendor of choice. The examples of companies that provide catalogues of building blocks include Enamine, WuXi AppTec and others. As such, these can be used as databases.

In some embodiments the selectivity filters database can provide selectivity filter data for analyzing and selecting the reaction pathways. The selectivity filters database can be any database that is manually devised in-house. The selectivity filter data can be a collection of common reactions with rules to detect conflicting chemical groups. The rules are supplemented by a list of available protecting groups where possible. All of the rules are specified as tuples containing a SMARTS-template of a reaction and a list of SMARTS-based molecular filters.

FIG. 2 illustrates a pathway construction method 200 for the pathway construction module 106 of FIG. 1. The pathway construction can include picking a molecule from the current position, which can include selection of the target molecule at block 202. The target molecule can then be analyzed for synthesis. The target molecule can then be analyzed to obtain reaction transformation suggestions from the single-step model at block 204, which includes the single-step reaction enumeration algorithm 112. This includes each reaction step to transform one or more reagents into a reaction product in the synthesis protocol to obtain the target molecule. Then, a reaction transformation can be picked at block 206. The transformation that is picked is then analyzed to obtain intermediate substrates of the synthesis protocol at block 208. The intermediate substrates can be the intermediate reaction products that are formed along the way for the reaction pathway to synthesize the target molecule. For example, a complex target molecule can be broken down into intermediate substrates that can then be reacted together or otherwise combined into the target molecule. Each of the intermediate substrates are then analyzed to determine if there are building blocks (e.g., reagents that can react to form an intermediate substrate) available at decision 210. This can include determining if the building blocks are commercially available from a vendor database. If the building blocks are available (e.g., yes), then the method 200 can proceed to output the final pathway at block 214. This output can occur if the building blocks for the intermediate substrates are readily available. Otherwise when decision 210 is no, then the method can determine if the maximum reaction step length has been achieved. If the maximum reaction step length is achieved, then the method outputs the final pathway at block 214. If the maximum reaction step length has not been achieved, the method reverts back to block 202 to pick another target molecule. A number of final pathways can be achieved by iterations of the method 200. As a result, the generated one or more final pathways can be output for the target molecule.

Figure 3:
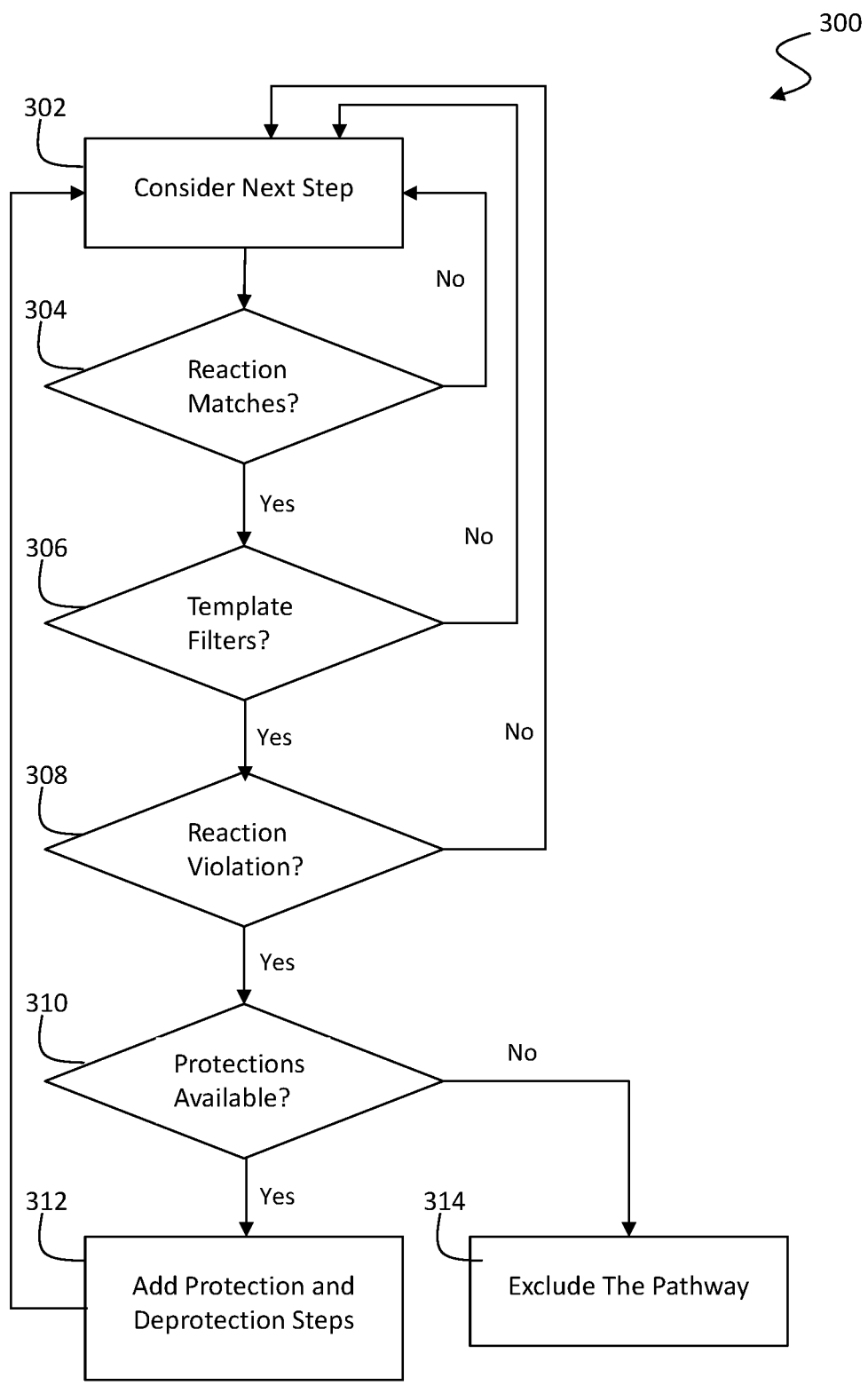
FIG. 3 includes a scheme for a method of a pathway post-processing routine.

FIG. 3 illustrates a pathway post-processing method 300 for post-processing a pathway obtained from the pathway construction module 108. Also, the input of the method 300 can be the output of FIG. 2, which can be the one or more final pathways. The post-processing can initiate by considering the next step of the reaction pathway at block 302. An analysis is performed to determine whether or not a reaction step or a sequence of reactions (e.g., part or entire synthesis protocol) matches any known reaction template at decision 304. For example, a particular reaction can be matched to a reaction template database to determine if a preexisting reaction is available. If a preexisting reaction is available for the particular reaction, then the next step can be performed. If there is no preexisting reaction available for matching with the particular reaction, then the method 300 returns to block 302 to consider the next step of the reaction. This shows the possible iterations of the method 300.

After the known reaction template match is identified, the method 300 can move to determine whether the known reaction template has any filters at decision 304. Each filter can be a criteria that a reaction includes or omits, which allows for filtering for certain reaction criteria. When there are no template filters for the known reaction template, then method 300 returns to block 302 to consider the next step of the reaction. If there are known template filters for the known reaction template, then the method 300 moves to the next step.

After filters for the known reaction template are identified, the reaction is analyzed to determine whether or not it violates any of the filter criteria at decision 308. If there are no reaction violations, then the method 300 returns to block 302 to consider the next step of the reaction. If there are reaction violations for any filter, then the method 300 moves to the next step.

After reaction violations are determined, the reaction is analyzed to determine whether there are any protections available for the filter that was violated by the reaction at decision 310. The protections (e.g., chemical protecting groups) that are available can then be used. When there are protections available, the method moves to the next step of adding protection and deprotection steps into the reaction at block 312. This allows the reaction step to be included, and the method 300 can then move to consider the next step of the reaction. If there is no protections available for a filter, then the pathway is excluded at block 314.

The method 300 allows for analysis of a reaction for known reaction templates, which then can be analyzed for filter criteria, violations of the filter criteria, and protections for the filter criteria so that a reaction step can be implemented. This can result in protection steps and deprotection steps being added to the reaction so that the reaction pathway can be utilized.

FIG. 4 illustrates a method 400 for pathway scoring, such as in the pathway scoring mechanism module 116. The reaction pathway can be scored, which can be for determining a minimum score (e.g., better score or optimal score) for an optimization scoring. The search and simulations of the chemical synthesis space search module 104 can include implementing the pathway scoring mechanism, which can be calculated in the following manner. The pathway to be scored can be obtained at block 402. The pathway score can be obtained at block 420 by implementing the scoring function, which can be referred to as a reward. That is, the reward is calculated for the whole pathway, such as at the end of each single simulation after the terminal state is reached. The number of steps is obtained at block 404 and implemented into the pathway score mechanism at block 420. The target molecule is obtained at block 406 and then analyzed for the synthetic accessibility at block 408, such as with the synthetic accessibility prediction model, which is used to calculate the synthetic accessibility score for the initial target molecule.

Additionally, the synthetic accessibility prediction model is used to calculate the synthetic accessibility score for the final substrate that is obtained at block 410, which is used to calculate the minimum synthetic accessibility a block 412. The synthetic accessibility increase is obtained by calculating the difference between the minimum substrate accessibility (block 410) and the target molecule synthetic accessibility (block 408). The synthetic accessibility increase is input into the pathway score mechanism at block 420. Additionally, each individual step is analyzed at block 416 for determining the likelihood of the respective reactions at block 418, which can be done by calculating using the reaction outcome prediction model 122 of FIG. 1. The likelihood of the respective reactions is provided to the pathway score mechanism at block 420.

The pathway score mechanism then calculates the reward (e.g., score) from the number of steps (block 404), synthetic accessibility increase (block 414) and likelihood of individual reaction steps (block 418). Then the pathway score is provided by the pathway score mechanism 116.

An embodiment of the method of pathways scoring of FIG. 4 can be provided as follows. To find the optimal pathway, the pathway is determined to be optimal if it delivers a minimum to the scoring function specified as the part of the task. During the search and simulations (e.g., chemical synthesis space search module 104) the pathway scoring function in the CASP system 100 is performed by the pathway scoring mechanism 116. The pathway scoring is calculated in the following manner. The reward is only calculated for the whole pathway, such as at the end of each single simulation after the terminal state is reached. The synthetic accessibility prediction model 120 is used to calculate synthetic accessibility scores for the initial target molecule. Also, the synthetic accessibility scores for the final substrates are calculated, and the minimum synthetic accessibility score is determined for each of the final substrates (e.g., final in the sense as they are final for the respective reaction pathway to synthesize the target molecule). The synthetic accessibility increase is calculated as the difference between the minimum substrate accessibility and target molecule accessibility. For each of the individual reaction steps, the likelihoods of the respective reaction steps are calculated using the reaction outcome prediction model 122. The reward is calculated as a combination of the number of steps, synthetic accessibility increase and likelihoods of reaction steps. Optionally, other pathway features can be included in the score. For example, a linear combination can be used:

$$S_{total} = \alpha_{len} S_{len} + \alpha_{sa} S_{sa} + \alpha_{lik} S_{lik},$$

where $S_{len}$ is the number of steps in the pathway, $S_{sa}$ is the synthetic accessibility increase, $S_{lik}$ is the joint likelihood of the reactions used in the pathway, $\alpha_{len}$, $\alpha_{sa}$ and $\alpha_{lik}$ are the user-specified coefficients.

FIG. 5A shows the method 500 for processing data with the reaction outcome prediction model (ROP model) 112 of the system of FIG. 1. The ROP model 112 can be based on Transformer architecture. Initially, chemical line nomenclature (e.g., SMILES) can be obtained for each source molecule (e.g., reagent) at block 502 and the product molecule (e.g., target) at block 504. The chemical line nomenclature for the source and target are each processed to represent each character of the chemical line nomenclature for all source molecules and the target molecule with a trainable embedding at block 506. The trainable embedding is proved with each unique character in the vocabulary being represented with its own trainable embedding shared by all occurrences of this character. Group-wise positional encodings are applied to the source molecules and the target molecule at block 508. The group-wise positional encoding can be technically the same as the usual positional encoding, but positions relative to the word (e.g., chemical line nomenclature) are used instead of global positions in the dot-separated string of concatenated reactants.

The characters of the chemical line notation (e.g., SMILES) can be represented as vectors. A user-specified parameter, which can be identified as "L", can be identified for the number of layers, where L layers of multihead self-attention is applied to the vectors representing the characters of the chemical line notation at block 510, which then results in character-level representations (e.g., Char-Level Representations, or CLRs) at block 512. It should be noted that the multihead self-attention can be repeated K times at block 510, which may be in parallel.

The CLR can then be considered, and group-wise multiheaded attention is applied at block 514. Group-wise multihead attention pooling can be performed by applying multihead attention to the CLRs as Key-Value pairs and a trainable Query vector. This can result in obtaining word-level representations (WLRs) of at least the reagents of the source or the target molecule at block 516. Each CLR can then be concatenated with the WLR of the word it belongs to at block 518, which can result in the combined representations (CRs) at block 520. Then, multihead attention is applied to the combined representations (CRs) as Key-Value pairs at block 522, where also multihead attention can be applied to the character-level representations of the target sequence (e.g., query). The multihead attention at block 522 can be repeated K times, such as in parallel.

A dense layer and log-softmax activation can be applied to the outputs at block 524 to obtain a probability distribution for the next character of the product (e.g., target) chemical line notation (e.g., SMILES), which is conditioned on its previous characters. For example, the first character can be the <START> auxiliary character. The log-likelihood of the target product chemical line notation (e.g., SMILES) can be calculated as the sum of predicted log-probabilities for the respective characters.

The following procedure is used to output the predicted likelihood of reaction (see FIG. 5A). Obtain the SMILES strings for each molecule involved in the specified reaction (both the reactants and the product) (blocks 502, 504). Represent each character of the SMILES strings for all molecules with a trainable embedding (each unique character in the vocabulary is represented with its own trainable embedding shared by all occurrences of this character) (block 506). Apply group-wise positional encoding (block 508), which is technically the same as the usual positional encoding, but positions relative to the word are used instead of global positions in the dot-separated string of concatenated reactants. Apply L (where L is a user-specified parameter) layers of multihead self-attention to the vectors representing the characters of reactant SMILES (block 510), thus obtaining character-level representations (CLRs) (block 512). Perform group-wise multihead attention pooling by applying multihead attention to CLRs as Key-Value pairs and a trainable Query vector (block 514), thus obtaining word-level representations (WLRs) (block 516). Concatenate each CLR with the WLR of the word it belongs to (block 518), thus obtaining combined representations (CRs) (block 520). Apply multihead attention to CRs as Key-Value pairs and target sequence character-level representations (block 522). Apply a dense layer and log-softmax activation to the outputs (block 524) to obtain probability distribution for the next character of the product SMILES conditioned on its previous characters (the first character being the <START> auxiliary character). Calculate the log-likelihood of the supposed product SMILES as the sum of predicted log-probabilities for the respective characters.

Figure 5B:
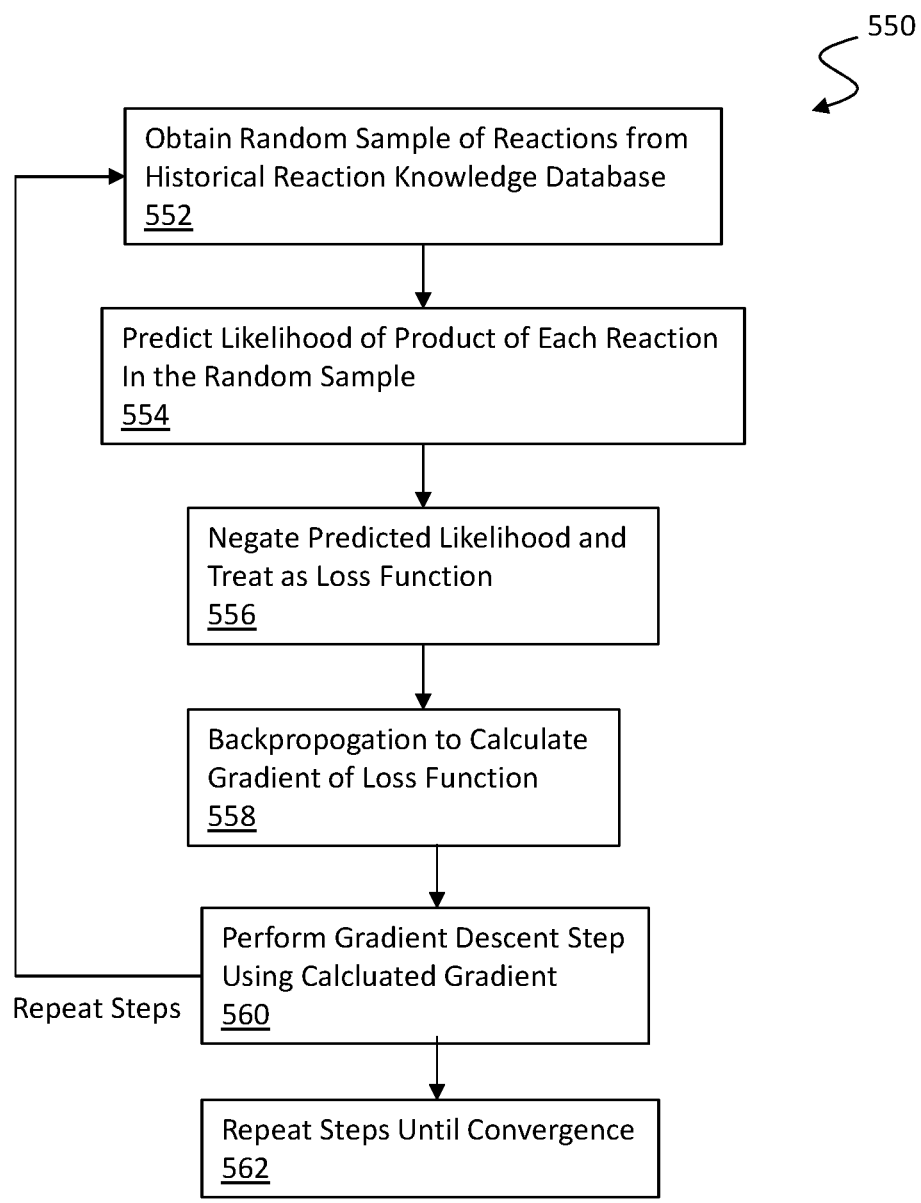
FIG. 5B includes a scheme for a method of a training procedure for the single-step reaction algorithm module.

FIG. 5B includes a method 550 for a training procedure for the single-step reaction algorithm module 112 of FIG. 1. The training method 550 can include obtaining a random sample of reactions from the historical reaction knowledge database at block 552. Then, the training method 500 can predict the likelihood of product of each reaction in the random sample that was obtained at block 554. The predicted likelihood is then negated to make a negative likelihood, which is treated as a loss function at block 556. Then, backpropagation is performed to calculate a gradient of the loss function at block 558. A gradient descent step is performed using the calculated gradient at block 556. The steps are repeated until there is convergence at block 562.

An example of the training procedure in method 550 is provided. The training procedure includes: (Step 1) Randomly sample a mini-batch of reactions from the historical reaction knowledge database; (Step 2) Predict (e.g., following the aforementioned procedure) the likelihood of the product of each reaction in the mini-batch; (Step 3) Negate this likelihood and treat the negative likelihood as a loss function; (Step 4) Perform backpropagation to calculate the gradient of the loss function with respect to the parameters of the neural network; (Step 5) Perform a gradient descent step using this calculated gradient; and Repeat steps (1)-(5) until convergence. This provides for the training of the single-step reaction algorithm module.

Figure 5C:
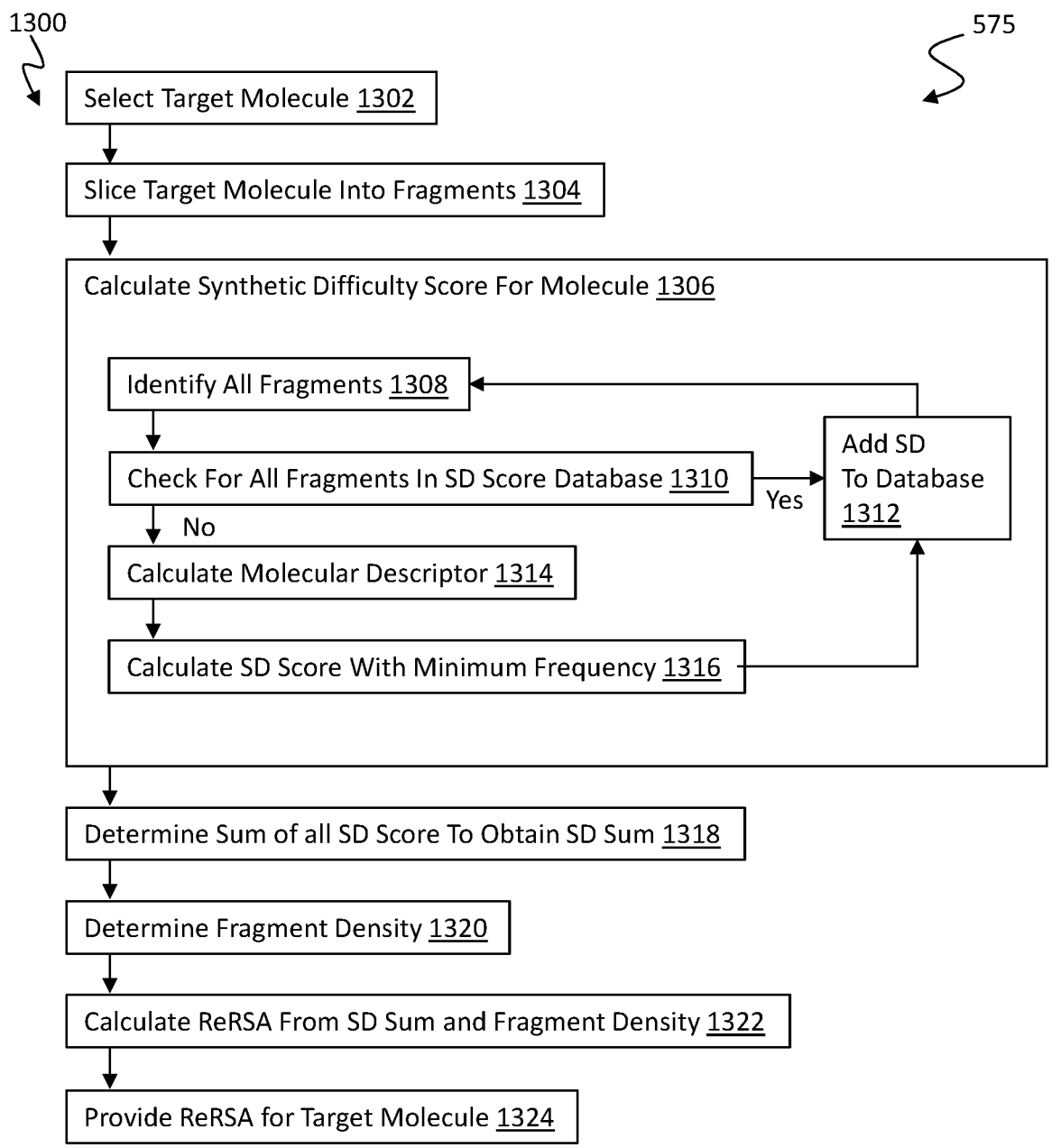
FIG. 5C includes a scheme for a method of providing a reaction pathway synthetic accessibility score.

FIG. 5C illustrates a synthetic accessibility approach 575, which is a retrosynthesis-related synthetic accessibility (ReRSA) estimation is a data processing protocol where the higher the occurrence (frequency) of "ready-to-synthesis fragments" in a molecule, the higher the synthetic accessibility of that molecule. The method can include a step to define what is a "ready-to-synthesis fragment" and/or identify those "ready-to-synthesis fragment" of a molecule to be synthesized. In the ReRSA method, a "ready-to-synthesis fragment" (RTSF) is a fragment that can be synthesized, which can be automatically obtained or identified by some predefined retrosynthesis-like decomposition procedure of molecules from a prepared virtual screening library of compounds, such as in a training dataset. Such a library should contain a large amount of already known synthetically accessible drug-like molecules. The best fit for that role are ready-to-use compound aggregators like open-sourced PubChem, ZINC and ChEMBL or vendor stocks like ChemDiv, Enamine or commercial databases, such as Clarivate Analytics Integrity (Cortellis Drug Discovery Intelligence).

FIG. 5C illustrates a ReRSA method 1300 that determines the ReRSA. The ReRSA method 1300 includes obtaining a target molecule to score with ReRSA (block 1302), where the molecule is in virtual format in descriptive data, such as graph data or string data. The target molecule is then split into molecular fragments (block 1304). The molecular fragments are analyzed through an iterative SD Score operation (block 1306). The iterative SD Score operation (block 1306) is performed until the SD Score for all molecular fragments of the target molecule are obtained.

The SD Score operation (block 1306) includes the following procedure. All fragments of the target molecule are identified (block 1308). All of the identified fragments are checked for an SD Score in the SD Score Database (block 1310). If it is determined that an identified fragment is in the SD Score database (e.g., a SD Score Library), then the SD Score of that identified fragment is added to an array of fragments for the target molecule (block 1312), which can be a listing of the array of fragments in a database with data for the target molecule. If it is determined that the identified fragment is not in the SD Score database, then the molecular descriptors (MD) for the identified fragment is calculated (block 1314). Then the SD Score is calculated with a minimum frequency (block 1316).

Once the SD Score is obtained for each fragment of the target molecule, the sum of all of the SD Scores of the fragments is calculated to obtain the SD Sum (block 1318). Then, the fragment density (FD) is calculated to measure the relative density of the synthesizable fragments that are in the molecule (block 1320). The ReRSA is then calculated from the SD Sum and FD (block 1322). The ReRSA is then provided for the target molecule (block 1324). The ReRSA of the target molecule can be saved in a database (e.g., ReRSA database), which allows for the ReRSA values for different molecules to be compared. For example, when multiple target molecules may have similar bioactivity, the ReRSA values can be used to determine which target molecule to use as a lead. In part, easier and less expensive synthesis can be helpful for preparation and commercialization of target molecules.

Figure 5D:
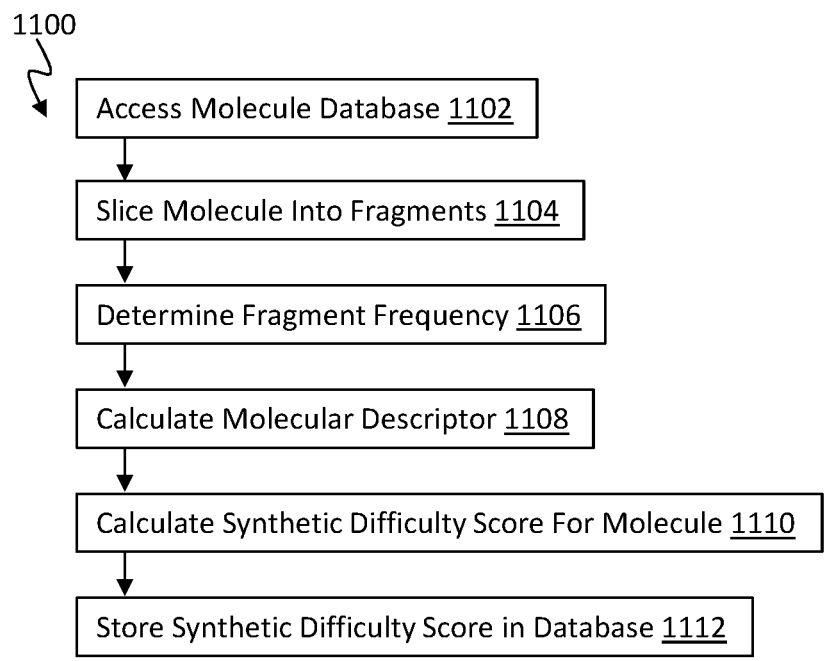
FIG. 5D includes a scheme for a method of providing a synthetic difficulty score.

FIG. 5D illustrates a method 1100 of data processing of molecule data to obtain a synthetic difficulty (SD) score (SD Score) for a target molecule. The method 1100 can determine a plurality of different SD Scores for a single molecule when there are a plurality of different synthetic pathways. The SD Score can be used to determine whether or not a molecule should be synthesized based on its difficulty of synthesis or when the difficulty of synthesis (e.g., SD Score) is worse compared to those of other target molecules. For example, the better SD Score between two compounds with similar bioactivity can determine which compound becomes a lead for drug development. Also, the SD Scores for one or more molecules can be included in an SD Score Database. This database allows for the accession and use of SD Scores for molecular synthesis analysis. The SD Scores can be obtained in the pathway scoring mechanism.

The method 1100 can obtain molecule data from a molecule database (block 1102), such as a commercial database (e.g., from a vendor). The molecule data is then processed through a fragmentation protocol that slices the one or more molecule (e.g., all molecules) into molecular fragments (block 1104), such as the RTSFs. The frequency of each molecular fragment (fragment frequency, "FF") is then determined for the library of molecules in the database (block 1106), which can provide an array of frequencies for the fragments. Here, the frequency of each fragment can be determined and stored in the database. Also, the fragment frequency can be associated with the molecule in the database. The molecular descriptor (MD) is calculated for every unique fragment in the molecule (block 1108). The SD Score is then determined from the FF and MD (block 1112) by aggregation thereof. The SD Score is stored in a SD Score Database (block 1112) (e.g., dictionary of SD Scores). The SD Score Database can then be used for molecule synthesis analyses. In some aspects, the method 1100 is a training method for a model. As such, the SD Score model is trained with the dataset in the method 1100, which allows for a SD Score protocol to use the trained model along with the SD Score Database. This facilitates determining the ReRSA. In a summary, the method can include: Split molecules using predefined algorithm; Acquire frequencies from learned base; Calculate descriptors as shown herein; Calculate scores as shown herein; and Store resulting scores.

The SAP module 120 can perform a protocol based on synthetic accessibility of the reaction pathway, which can include the protocol of International PCT Application No. PCT/IB2021/054029, which is incorporated herein by specific reference in its entirety.

In some embodiments, a method of determining a synthesis pathway of a chemical compound is provided. The method can include providing a structure of target compound and processing the target compound with a reaction enumeration algorithm to obtain at least one reaction pathway. The method can include processing the target compound with the at least one reaction pathway scoring mechanism. The method can include selecting at least one reaction pathway for the target compound. The method can include ranking the at least one reaction pathway, such that there is a ranking list of reaction pathways ranked in chronological order of the score. The method can include providing the ranked at least one reaction pathway. In some aspects, the reaction enumeration algorithm is for a single reaction step, and the reaction enumeration algorithm is trained with reaction data.

In some embodiments, the pathway scoring mechanism includes: an analysis of reactions with a reaction outcome prediction model; providing a building block database of the reactions; determining synthetic accessibility of the reactions with a synthetic accessibility prediction model; providing predicted scores of synthetically accessible reactions; determining reaction condition predictions with a reaction condition prediction model; and providing predicted conditions of the reactions. In some aspects, the method includes processing the at least one reaction pathway with reaction selectivity filters.

In an example of the method, the following protocol can be performed: picking a molecule; obtain chemical reaction transformation suggestions from a single step reaction enumeration algorithm; picking a single-step reaction transformation; obtaining intermediate substrates for being reagents for the particular transformation; and then determine whether building blocks are available for the intermediate substrates. This determination can include: if the building blocks are available, then output the final pathway. Also, this determination can include: if the building blocks are not available, then determine if a maximum length is exceeded. If the maximum length is exceeded, then the system can output the final pathway. Alternatively, if the maximum length is not exceeded, then the system can pick another reaction pathway to obtain the target molecule.

In some embodiments, the method can consider a next reaction step to be analyzed when none of the conditions match the query. Here, if the reaction step does not match a reaction template, then the next step is considered because there is no reaction template to base an exclusion from. Once a reaction step is analyzed with the protocol until receiving a "no", then the protocol moves to the next step.

The analysis can include determining that a reaction matches a known template. If the reaction matches a known template, then determine that the reaction does not violate a criteria of the known template. If the reaction violates a criteria of the known template, then determine whether protection and/or protection reactions can be used. If chemical protection is available, then a protection and/or deprotection step is added to the reaction pathway. If protection not available, then this pathway is excluded. In this method, any negative answer to the determinations can then result in analyzing the next step. The next step can be the next step in obtaining the target molecule. This allows each step to be analyzed for optimizing the reaction pathway and each reaction step.

In some embodiments, a pathway scoring routine can include at least one of (and optionally all): assessing the target molecule, synthetic accessibility, and synthetic accessibility increase and pathway score; assessing number of steps of pathway and pathway score; assessing final substrates, minimum synthetic accessibility, synthetic accessibility increase and pathway score; or assessing individual steps, likelihood of success, and pathway score.

In some embodiments, a reaction pathway determination or scoring method can include: performing a single-step reaction analysis with an algorithm; performing a pathway scoring function; performing a search with a search algorithm suitable for synthetic pathway planning; processing a reaction outcome prediction module for at least one synthetic pathway; processing at least one synthetic pathway with a post-processing module criteria to filter out violating pathways; and providing at least one reaction pathway.

In some embodiments, a computing system is configured with a processor for carrying out one of the methods recited herein. The computer can include a non-transient computer readable medium that operate with the processor for performing the method steps.

In some embodiments, a non-transient computer readable medium can have instructions stored thereon, which when executed by the processor of the computing system, cause performance of one of the methods described herein. The non-transient computer readable medium can be a computer program product, which can be operated on with the computing system described herein.

EXAMPLES

The retrosynthesis example is now described. As a single-step reaction enumeration algorithm, the system used the Graph Logic Network (GLN); Monte Carlo Tree Search (MCTS) was used as a search algorithm. The SAscore method from the rdkit Python package was used as a synthetic accessibility prediction model.

The following data sources were used: USPTO-50K as the historical reaction knowledge database; and Building block database was acquired from Enamine as the list of compounds available for purchase from this supplier. The CASP system was tested on molecules from another Enamine database that contains several thousand compounds, which are guaranteed to be synthesizable from their building block in 5-7 steps at most. For the test we selected 100 random molecules and 44 hand-picked examples from this database, ran them through the CASP system and evaluated the results from two perspectives: (1) Purely mechanistic, such as if the system was able to find any pathway; and (2) Chemical, such as if the pathways that the system produced are valid and selective.

For these two perspectives, we introduced separate metrics of quality as follows. First, percentage of solved molecules was used, which is the ratio of molecules that the CASP system was able to reduce to building blocks. Second, the Chemical score was calculated using the following formula:

$$S_{chem} = \frac{\sum_i n_{effective}(i) - n_{redundant}(i)}{\sum_i n_{required}(i)}$$

In this equation, the following are defined: $n_{effective}(i)$ and $n_{redundant}(i)$ denote, respectively, the number of effective and redundant steps observed in the constructed pathway for molecule i, while $n_{required}(i)$ denotes the required number of steps to reduce the molecule i to building blocks as viewed by the chemist.

The system performed several experiments with different setups of the scoring function to evaluate the performance and select the best output (see Table 1).

TABLE 1

| Scoring function | Mechanistic score |
| --- | --- |
| $\begin{cases} 1, & \text{if solved;} \\ 0, & \text{otherwise} \end{cases}$ | 73% (78/100) |
| $-5S_{len} + 10S_{sa} + 0.01S_{lik}$ | 68% (74/100) |
| $\begin{cases} -5S_{len} + 10S_{sa} + 0.01S_{lik}, & \text{if solved;} \\ 0, & \text{otherwise} \end{cases}$ | 88% (88/100) |

For the best scoring function in terms of mechanistic score, the system also performed chemical evaluation of the obtained pathways and assigned chemical scores to them (see Table 2).

TABLE 2

| Score | 100 random | 44 hand-picked |
| --- | --- | --- |
| Mechanistic | 88% (88/100) | 97.7% (43/44) |
| Chemical | 80% | 73.45% |

Figure 7:
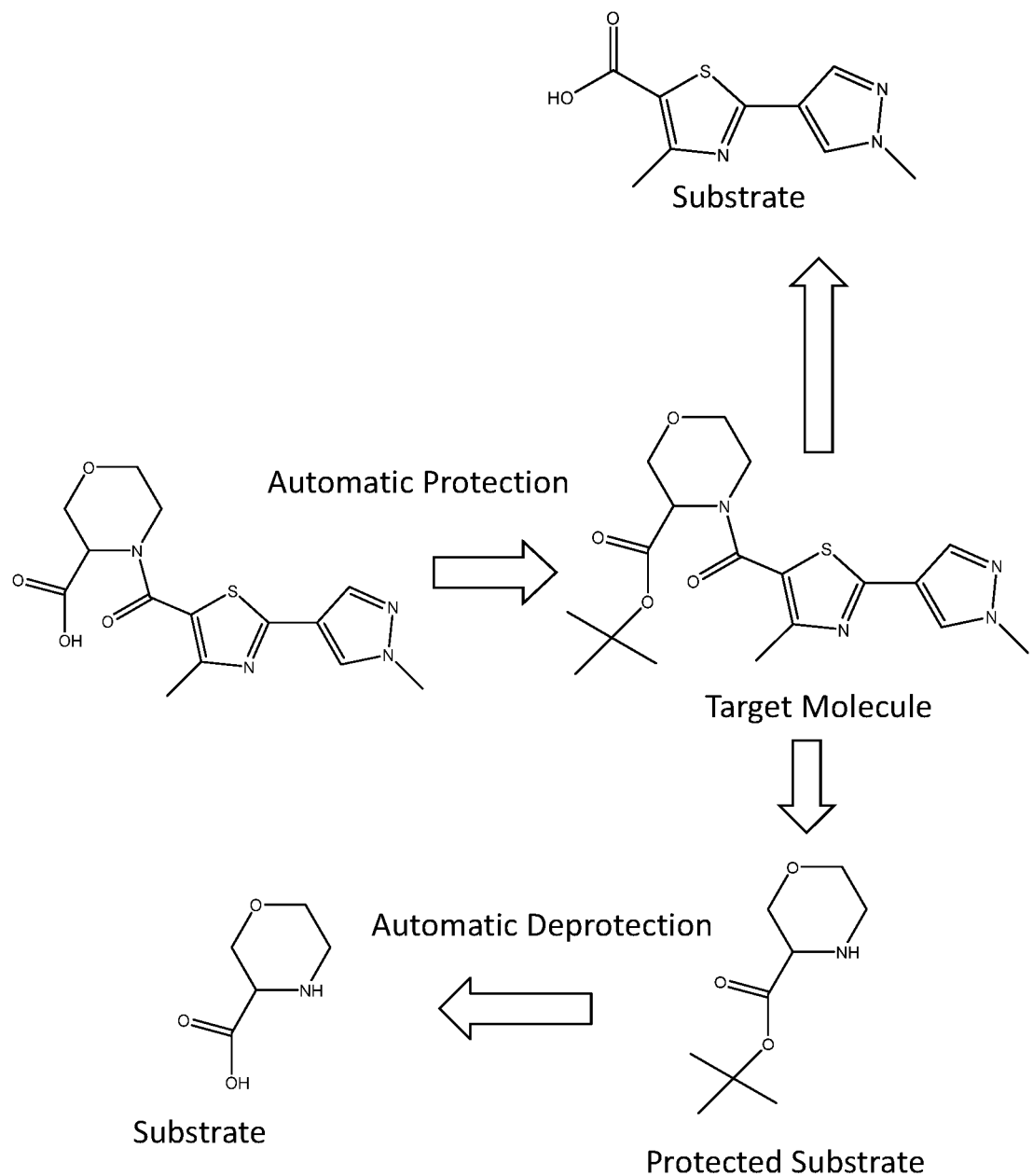
FIG. 7 illustrates an example of a successful pathway generated by the CASP system described herein.
Figure 8:
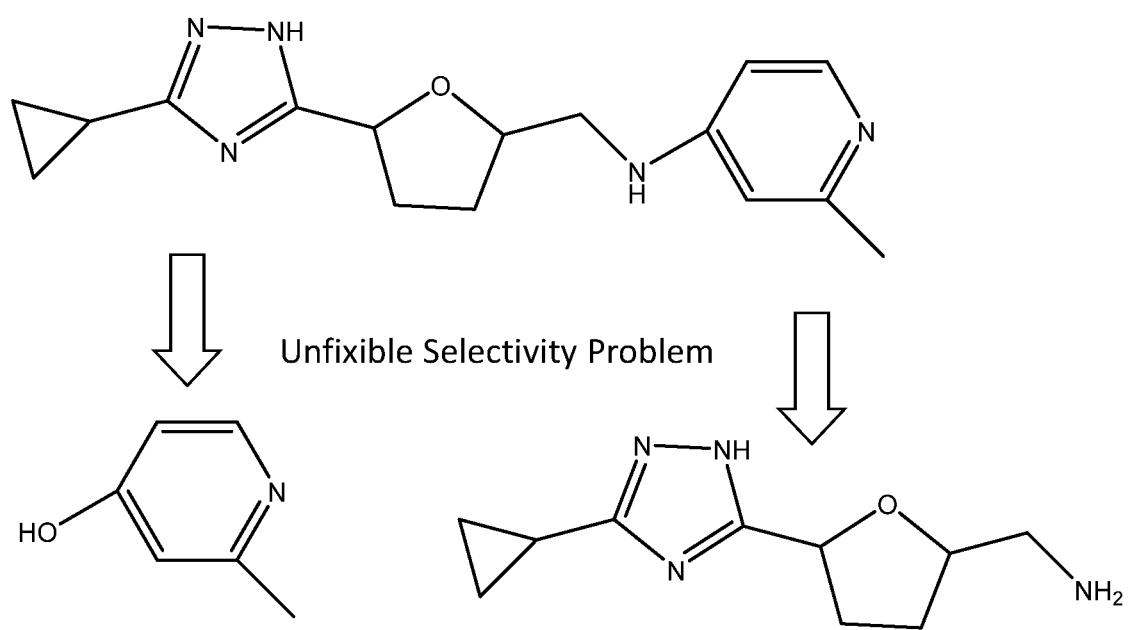
FIG. 8 illustrates an example of an unsuccessful pathway.
Figure 9:
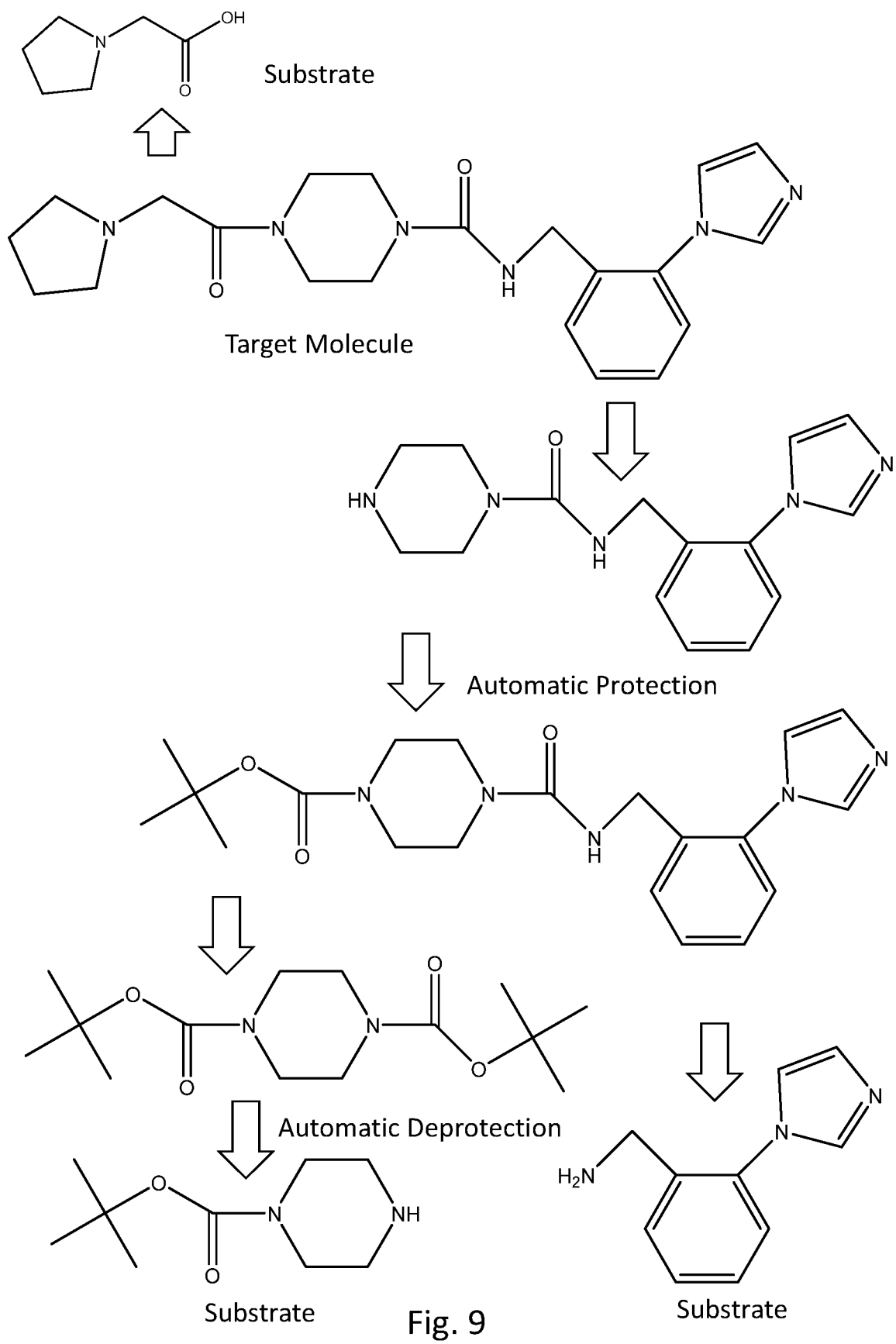
FIG. 9 illustrates an example of a successful pathway generated by the CASP system described herein.

FIGS. 7, 8, and 9 provide examples of pathways produced by the proposed system. The syntheses in FIGS. 7 and 9 are examples of successful application of the system. The synthesis in FIG. 8, however, is incorrect because of the unfixable selectivity problem in its single reaction leading directly to the commercial building blocks.

One skilled in the art will appreciate that, for the processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

In one embodiment, the present methods can include aspects performed on a computing system. As such, the computing system can include a memory device that has the computer-executable instructions for performing the methods. The computer-executable instructions can be part of a computer program product that includes one or more algorithms for performing any of the methods of any of the claims.

In one embodiment, any of the operations, processes, or methods, described herein can be performed or cause to be performed in response to execution of computer-readable instructions stored on a computer-readable medium and executable by one or more processors. The computer-readable instructions can be executed by a processor of a wide range of computing systems from desktop computing systems, portable computing systems, tablet computing systems, hand-held computing systems, as well as network elements, and/or any other computing device. The computer readable medium is not transitory. The computer readable medium is a physical medium having the computer-readable instructions stored therein so as to be physically readable from the physical medium by the computer/processor.

There are various vehicles by which processes and/or systems and/or other technologies described herein can be effected (e.g., hardware, software, and/or firmware), and that the preferred vehicle may vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The various operations described herein can be implemented, individually and/or collectively, by a wide range of hardware, software, firmware, or virtually any combination thereof. In one embodiment, several portions of the subject matter described herein may be implemented via application specific integrated circuits (ASICs), field programmable gate arrays (FPGAs), digital signal processors (DSPs), or other integrated formats. However, some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware are possible in light of this disclosure. In addition, the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a physical signal bearing medium include, but are not limited to, the following: a recordable type medium such as a floppy disk, a hard disk drive (HDD), a compact disc (CD), a digital versatile disc (DVD), a digital tape, a computer memory, or any other physical medium that is not transitory or a transmission. Examples of physical media having computer-readable instructions omit transitory or transmission type media such as a digital and/or an analog communication medium (e.g., a fiber optic cable, a waveguide, a wired communication link, a wireless communication link, etc.).

It is common to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. A typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems, including feedback loops and control motors (e.g., feedback for sensing position and/or velocity; control motors for moving and/or adjusting components and/or quantities). A typical data processing system may be implemented utilizing any suitable commercially available components, such as those generally found in data computing/communication and/or network computing/communication systems.

The herein described subject matter sometimes illustrates different components contained within, or connected with, different other components. Such depicted architectures are merely exemplary, and that in fact, many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include, but are not limited to: physically mateable and/or physically interacting components and/or wirelessly interactable and/or wirelessly interacting components and/or logically interacting and/or logically interactable components.

Figure 6:
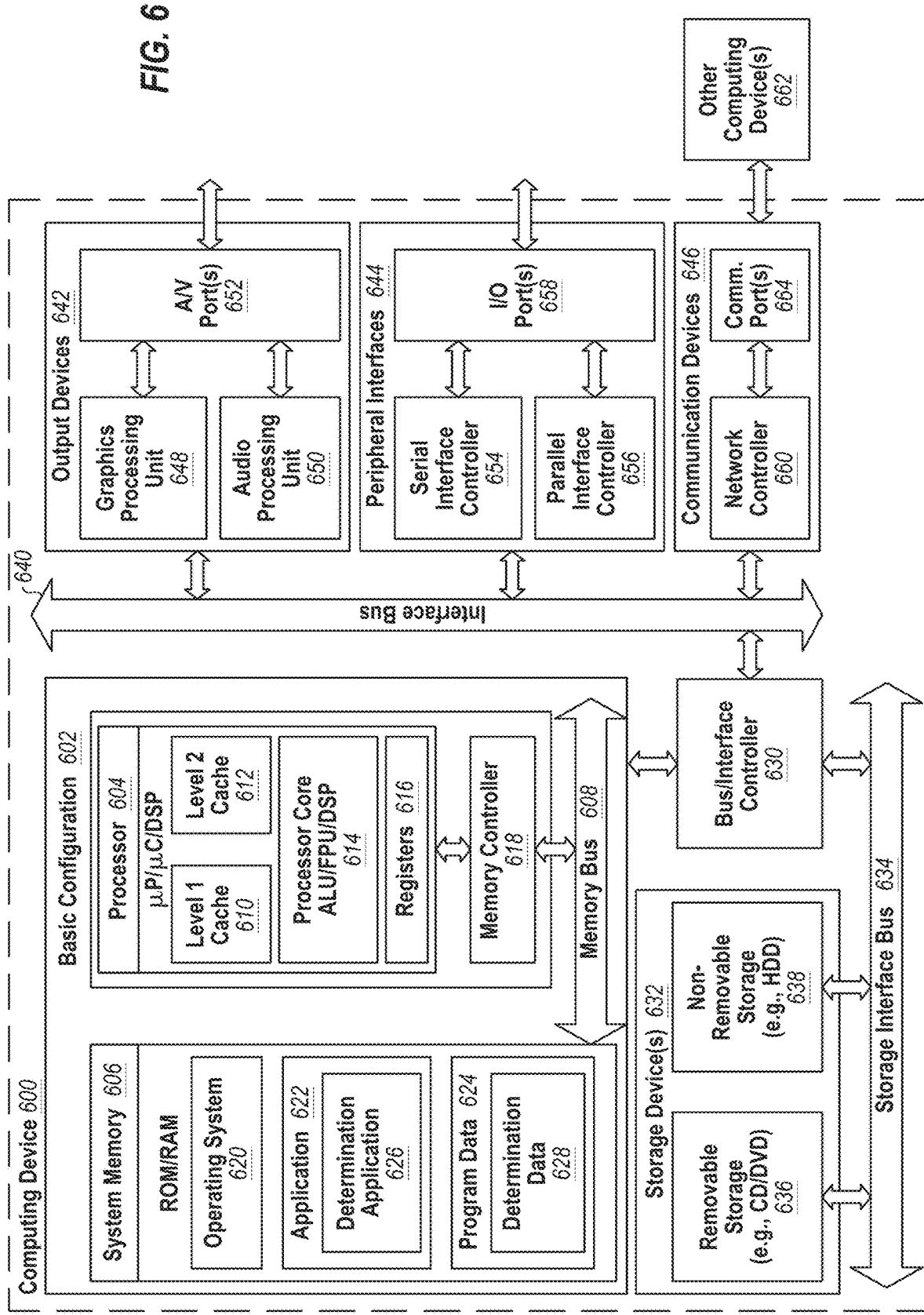
FIG. 6 includes a schematic representation of a computing system that can be used to implement any of the computing methods.

FIG. 6 shows an example computing device 600 (e.g., a computer) that may be arranged in some embodiments to perform the methods (or portions thereof) described herein. In a very basic configuration 602, computing device 600 generally includes one or more processors 604 and a system memory 606. A memory bus 608 may be used for communicating between processor 604 and system memory 606.

Depending on the desired configuration, processor 604 may be of any type including, but not limited to: a microprocessor (µP), a microcontroller (µC), a digital signal processor (DSP), or any combination thereof. Processor 604 may include one or more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with processor 604, or in some implementations, memory controller 618 may be an internal part of processor 604.

Depending on the desired configuration, system memory 606 may be of any type including, but not limited to: volatile memory (such as RAM), non-volatile memory (such as ROM, flash memory, etc.), or any combination thereof. System memory 606 may include an operating system 620, one or more applications 622, and program data 624. Application 622 may include a determination application 626 that is arranged to perform the operations as described herein, including those described with respect to methods described herein. The determination application 626 can obtain data, such as pressure, flow rate, and/or temperature, and then determine a change to the system to change the pressure, flow rate, and/or temperature.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include: magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include: volatile and non-volatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to: RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may generally be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR), and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that includes any of the above functions. Computing device 600 may also be implemented as a personal computer including both laptop computer and non-laptop computer configurations. The computing device 600 can also be any type of network computing device. The computing device 600 can also be an automated system as described herein.

The embodiments described herein may include the use of a special purpose or general-purpose computer including various computer hardware or software modules.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

In some embodiments, a computer program product can include a non-transient, tangible memory device having computer-executable instructions that when executed by a processor, cause performance of a method that can include: providing a dataset having object data for an object and condition data for a condition; processing the object data of the dataset to obtain latent object data and latent object-condition data with an object encoder; processing the condition data of the dataset to obtain latent condition data and latent condition-object data with a condition encoder; processing the latent object data and the latent object-condition data to obtain generated object data with an object decoder; processing the latent condition data and latent condition-object data to obtain generated condition data with a condition decoder; comparing the latent object-condition data to the latent-condition data to determine a difference; processing the latent object data and latent condition data and one of the latent object-condition data or latent condition-object data with a discriminator to obtain a discriminator value; selecting a selected object from the generated object data based on the generated object data, generated condition data, and the difference between the latent object-condition data and latent condition-object data; and providing the selected object in a report with a recommendation for validation of a physical form of the object. The non-transient, tangible memory device may also have other executable instructions for any of the methods or method steps described herein. Also, the instructions may be instructions to perform a non-computing task, such as synthesis of a molecule and or an experimental protocol for validating the molecule. Other executable instructions may also be provided.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

All references recited herein are incorporated herein by specific reference in their entirety.

The invention claimed is:

1. A method of determining synthesis of a chemical compound, the method comprising:
providing target compound data of a structure of a target compound;
performing a chemical synthesis search with the target compound data for at least one reaction pathway for the target compound;
processing the target compound data through a single-step reaction enumeration algorithm to obtain at least one reaction step of the at least one reaction pathway, the reaction step having a substrate set of reagents that produce the target compound or a target compound precursor, wherein the single-step reaction enumeration algorithm is configured to generate a list of possible single-step reactions including the at least one reaction step;

processing the at least one reaction step of the at least one reaction pathway of the target compound with the at least one reaction pathway scoring mechanism model to obtain a reaction step score for each reaction step or each reaction pathway;

constructing a plurality of reaction pathways for the target compound based on the at least one reaction step and the at least one reaction step score;

providing at least one reaction selectivity filter having a selectivity criteria;

filtering the plurality of reaction pathways with the at least one reaction selectivity filter, wherein any reaction pathway violating the selectivity criteria is filtered out of the plurality of reaction pathways;

ranking the plurality of reaction pathways to obtain a reaction pathway listing;

providing the reaction pathway listing having the ranked reaction pathways;

selecting a reaction pathway from the reaction pathway listing; and synthesizing the target compound into a physical form based on the selected reaction pathway.

2. The method of claim 1, wherein the chemical synthesis search can include:

consider the target compound as a one molecule set;

choosing an expansion variant of at least one substrate set of reagents;

identify a group of molecules of the at least one substrate set in a current position being building blocks of the target in a reaction step; and scoring the reaction step having the identified group of molecules.

3. The method of claim 2, wherein a Monte-Carlo Tree Search (MCTS) is a heuristic search algorithm is applied as mode of performing expansion variation from which the expansion variant is chosen.

4. The method of claim 1, further comprising at least one of:

the target compound data is obtained from a non-transient database by accessing the database and causing the database to transmit the target compound data to an input module of a computing system, which input module loads the target compound data; or the computing system accesses a database having chemical reaction data and performs a chemical synthesis search with the target compound data for the at least one reaction pathway for the target compound, wherein the chemical reaction data is selected based on the target compound data to identify one or more candidate reaction steps of at least one reaction pathway, wherein the computing system saves the chemical reaction data.

5. The method of claim 1, wherein at least one of:

the computing system processes the target compound data and chemical reaction data through the single step reaction enumeration algorithm to obtain the at least one reaction step of the least one reaction pathway, wherein the reaction step has the substrate set of the reagents that produce the target compound or a target compound precursor, which are stored in a reaction step database, wherein the computing system saves the at least one reaction step data; or the computing system processes the at least one reaction step of the at least one reaction pathway of the target compound with the at least one reaction pathway scoring mechanism model to obtain the reaction step score for each reaction step or each reaction pathway, wherein the reaction step score is calculated based on rewards for favorable reaction parameters, wherein the computing system saves the at least one reaction step score.

6. The method of claim 1, wherein at least one of:

the computing system constructs a plurality of reaction pathways for the target compound based on the at least one reaction step and the at least one reaction step score, wherein each reaction pathway includes at least one reaction step having a reaction step score, wherein a reaction pathway score is obtained for each reaction pathway as a summation of each reaction step score contained in the respective reaction pathway, wherein the computing system saves each reaction pathway score;

the computing system accesses a database having at least one reaction selectivity filter having a selectivity criteria, and loading the at least one reaction selectivity criteria for processing in a comparison module with each reaction pathway, wherein at least one reaction template is provided that possibly has one or more known reaction violations;

the computing system compares the plurality of reaction pathways with the at least one reaction selectivity filter by performing a matching protocol with each reaction pathway and the at least one reaction template, wherein the matching protocol includes matching each reaction step with each reaction template and assessing for a violation of the reaction template, wherein any reaction pathway violating the selectivity criteria is filtered out of the plurality of reaction pathways, wherein the computing system saves the reaction pathways that are not filtered out;

the computing system compares the reaction pathway score of each remaining reaction pathway after the filtering to obtain the ranking of the plurality of reaction pathways to obtain a reaction pathway listing, wherein the computing system saves the reaction pathway listing, which can include links to each reaction pathway data; or the computing system provides the reaction pathway listing having at least one of the ranked reaction pathways, wherein each reaction pathway is provided with a reaction pathway having each reaction step to synthesize the target compound, wherein the reaction pathway includes synthesis instructions for synthesizing the target compound.

7. The method of claim 1, wherein the single-step reaction enumeration algorithm is used for each single reaction step in a reaction pathway, the method comprising training the reaction enumeration algorithm with reaction data from a reaction data dataset.

8. The method of claim 1, wherein the pathway scoring mechanism model is configured to provide the reaction step score by at least one of:

analyzing each reaction step with a reaction outcome prediction model to obtain a reaction likelihood for each reaction step;

looking up each substrate building block of each substrate set of each reaction step from a building block database of the reactions;

determining a synthetic accessibility predicted score of each of the reaction steps with a synthetic accessibility prediction model, which provides the predicted scores;

determining reaction condition predictions with a reaction condition prediction model, which provides predicted conditions; and determining a pathway score for each reaction step or reaction pathway by: considering availability of building blocks for each reaction step; considering predicted scores for each reaction step from the synthetic accessibility model; considering the reaction likelihood of each reaction step obtained from the reaction outcome prediction model; and considering predicted conditions for each reaction step from the reaction condition prediction model.

9. The method of claim 1, comprising processing at least one reaction step of the at least one reaction pathway of the target compound with the at least one reaction pathway scoring mechanism model to obtain a reaction step score for each reaction step or each reaction pathway.

10. The method of claim 1, wherein filtering is performed by comparing the plurality of reaction pathways with the at least one reaction selectivity filter by performing a matching protocol with each reaction pathway and the at least one reaction template, wherein the matching protocol includes matching each reaction step with each reaction template and assessing for a violation of the reaction template, wherein any reaction pathway violating the selectivity criteria is filtered out of the plurality of reaction pathways, wherein the computing system saves the reaction pathways that are not filtered out.

11. The method of claim 1, further comprising:
selecting the target compound;
obtaining at least one transformation suggestions for each reaction step in a reaction pathway, each transformation suggestion being from the single-step reaction enumeration algorithm;
picking a selected transformation;
identifying a set of intermediate substrates for the selected transformation; and
searching a building block database to determine whether building blocks are available for each intermediate substrate for the set of intermediate substrates.

12. The method of claim 11, further comprising:
in response to the building blocks being available, outputting the reaction pathway as a final reaction pathway.

13. The method of claim 11, further comprising:
in response to the building blocks not being available, determining if a maximum number of reaction steps is exceeded; and
in response to the maximum number of reaction steps being exceeded, outputting the reaction pathway as a final reaction pathway, or
in response to the maximum number of reaction steps not being exceeded, picking another reaction pathway.

14. The method of claim 1, further comprising:
considering a first reaction step of a first reaction pathway of a first target molecule; and
performing a matching protocol that determines whether the first reaction step matches a known reaction template;
in response to the first reaction step matching a known reaction template, determining whether the reaction template has any criteria; or
in response to the first reaction step not matching a known reaction template, moving to a second reaction step and performing the matching protocol with the second reaction step.

15. The method of claim 14, further comprising:
performing a matching protocol that determines whether the first reaction violates a criteria;
in response to the first reaction step matching a known reaction template violation, determining whether the reaction template has any protection and deprotection steps; or
in response to the first reaction step not matching a known reaction template violation, moving to a second reaction step and performing the matching protocol with the second reaction step.

16. The method of claim 15, further comprising:
determining whether there is a protection reaction and deprotection reaction scheme to overcome the reaction template violation,
in response to the protection reaction and deprotection reaction scheme being available, adding the protection reaction and deprotection reaction scheme to the first reaction step; or
in response to the protection reaction and deprotection reaction scheme not being available, excluding the first reaction step from the reaction pathway.

17. The method of claim 1, comprising a pathway scoring routine to obtain a pathway score, which includes at least one of:
assessing the target compound, synthetic accessibility, and synthetic accessibility increase to obtain the pathway score;
assessing number of steps of pathway to obtain the pathway score;
assessing final substrates, a minimum synthetic accessibility of the final substrates, and the synthetic accessibility increase to obtain the pathway score; or
assessing individual steps and likelihood of successfully completing the individual steps to obtain the pathway score.

18. The method of claim 1, wherein a reaction outcome prediction model is based on a transformer architecture, the method comprising:
obtaining a chemical line nomenclature for a source substrate and a target product, wherein characters of the chemical line nomenclature are vectors;
performing group-wise positional encodings to the character vectors of the chemical line nomenclature for the source substrate and target product;
performing at least one layer of multihead self-attention to character vectors to obtain a character-level representation of each source substrate and target product;
performing group-wise multihead attention pooling to the character-level representations to obtain word-level representations of the source substrate and target product;
concatenating the character-level representations with the word-level representations of the source substrate and target product to obtain combined representations of the source substrate and target product;
performing a multihead attention to the combined representations;
determining a probability distribution for the source substrate and target product; and
output a reaction likelihood of the source substrate reacting to form the target product based on the probability distribution.

19. The method of claim 1, further comprising:
performing a single-step reaction analysis with an algorithm;
performing a pathway scoring function;
performing a search with a search algorithm suitable for synthetic pathway planning;

processing a reaction outcome prediction module for at least one synthetic pathway;

processing at least one synthetic pathway with a post-processing module criteria to filter out violating pathways; and providing at least one reaction pathway.

20. The method of claim 1, further comprising:

validating the synthesized target compound as being a physical form of the target molecule.

21. The method of claim 20, wherein the reaction pathway listing is accessed to select a reaction pathway, the method comprising:

obtaining a physical form of the substrate set for each reaction step, wherein the substrate step includes reactants that produce an intermediate substrate or the target molecule;

reacting the substrate set in reaction conditions to produce a physical form of the intermediate substrate or target molecule; and repeating the reacting until producing the physical form of the target molecule.

22. A computer system comprising:

one or more processors; and one or more non-transitory computer readable media storing instructions that in response to being executed by the one or more processors, cause the computer system to perform operations, the operations comprising the method of claim 1.

23. One or more non-transitory computer readable media storing instructions that in response to being executed by one or more processors, cause a computer system to perform operations, the operations comprising the method of claim 1.

* * * * *